United States Patent

Tagato et al.

[11] Patent Number: 6,081,212
[45] Date of Patent: Jun. 27, 2000

[54] DECODER USING A FINITE STATE MACHINE IN DECODING AN ABSTRACT SYNTAX NOTATION-MESSAGE AND AN ENCODER FOR CARRYING OUT ENCODING OPERATION AT A HIGH SPEED

[75] Inventors: Hiroki Tagato; Yoshiaki Kiriha; Shoichiro Nakai, all of Tokyo, Japan

[73] Assignee: NEC Corporation, Tokyo, Japan

[21] Appl. No.: 09/030,860

[22] Filed: Feb. 26, 1998

[30]     Foreign Application Priority Data

Feb. 26, 1997 [JP] Japan .................................. 9-041837
Jul. 24, 1997 [JP] Japan .................................. 9-198994

[51] Int. Cl.[7] .............................. G06F 9/45; G06F 15/00
[52] U.S. Cl. ............................................ 341/79; 395/708
[58] Field of Search ............................. 341/79, 107, 78, 341/106; 395/708, 800

[56]     References Cited

U.S. PATENT DOCUMENTS

| 4,686,623 | 8/1987 | Wallace | 364/300 |
| 5,511,213 | 4/1996 | Correa | 395/800 |
| 5,572,206 | 11/1996 | Miller et al. | 341/51 |
| 5,619,718 | 4/1997 | Correa | 395/800 |
| 5,812,074 | 9/1998 | Chung | 341/67 |

FOREIGN PATENT DOCUMENTS 1-198145  8/1989  Japan .
7-98676   5/1995  Japan .

OTHER PUBLICATIONS

Bilgic et al., "Performance Comparison of ASN.1 Encoder/Decoders Using FTAM", Computer communications, vol. 16, No. 4, (1993) pp. 229–240.

*Primary Examiner*—Michael Tokar
*Assistant Examiner*—Peguy JeanPierre
*Attorney, Agent, or Firm*—Foley & Lardner

[57]     ABSTRACT

In a message decoder (1) including a message decoding section (102) which is supplied with an encoded message given by encoding, according to the Basic Encoding Rule, an objective message defined by an abstract syntax description described in accordance with the Abstract Syntax Notation and which decodes the encoded message into a decoded message corresponding to the objective message, the message decoder further includes a finite state machine generator (2). Alternatively, the message decoder is for use in combination with the finite state machine generator. The finite state machine generator includes a parse tree generating section supplied with the abstract syntax description for generating a parse tree corresponding to the abstract syntax description and a finite state machine generating section for generating a finite state machine (105) on the basis of the parse tree. The message decoding section is connected to the finite state machine generating section to decode the encoded message into the decoded message by the use of the finite state machine.

21 Claims, 21 Drawing Sheets

```
User-data ::= CHOICE {
  simply-encoded-data [APPLICATION 0] IMPLICIT OCTET STRING,
  fully-encoded-data [APPLICATION 1] IMPLICIT Fully-encoded-data
}
Fully-encoded-data ::= SEQUENCE OF PDV-list
PDV-list ::= SEQUENCE {
  transfer-syntax-name OBJECT IDENTIFIER OPTIONAL,
  presentation-context-identifier INTEGER,
  presentation-data-values CHOICE {
     single-ASN1-type  [0] ANY,
     octet-aligned     [1] IMPLICIT OCTET STRING,
     arbitrary         [2] IMPLICIT BIT STRING
  }
}
ROSEapdus ::= CHOICE {
  roiv-apdu [1] IMPLICIT ROIVapdu,
  rors-apdu [2] IMPLICIT RORSapdu,
  roer-apdu [3] IMPLICIT ROERapdu,
  rorj-apdu [4] IMPLICIT RORJapdu
}
ROIVapdu ::= SEQUENCE {
  invokeID InvokeIDType,
  linked-ID [0] IMPLICIT InvokeIDType OPTIONAL,
  operation-value OPERATION,
  argument ANY DEFINED BY operation-value OPTIONAL
}
```

FIG. 2

```
RORSapdu ::= SEQUENCE {
   invokeID InvokeIDType,
   result SEQUENCE {
      operation-value OPERATION,
      result ANY DEFINED BY operation-value
   } OPTIONAL
}
ROERapdu ::= SEQUENCE {
   invokeID InvokeIDType,
   error-value ERROR,
   parameter ANY DEFINED BY error-value OPTIONAL
}
RORJapdu ::= SEQUENCE {
   invokeID CHOICE {
      invokeIDType InvokeIDType,
      null         NULL
   }
   problem CHOICE {
      generalProblem      [0] IMPLICIT GeneralProblem,
      invokeProblem       [1] IMPLICIT InvokeProblem,
      returnResultProblem [2] IMPLICIT ReturnResultProblem,
      returnErrorProblem  [3] IMPLICIT ReturnErrorProblem
   }
}
OPERATION ::= CHOICE {
   localValue INTEGER,
   globalvalue OBJECT IDENTIFIER
}
ERROR ::= CHOICE {
   localValue INTEGER,
   globalValue OBJECT IDENTIFIER
}
```

F I G. 3

```
User-data = fully-encoded-data : {
  {
    presentation-context-identifier 3,
    presentation-data-values single-ASN1-type: ROSEapdus:roiv-apdu: {
      invokeID 5,
      operation-value localValue: 3,
      argument GetArgument:  {
        baseManagedObjectClass    globalForm:  { iso 1 2 3 } ,
        baseManagedObjectInstance nonSpecificForm: '616263'H
      }
    }
  }
}
```

F I G . 4

```
PDU ::= CHOICE {
   apdu [1] APDUType,
   bpdu [2] BPDUType
}
APDUType ::= SEQUENCE OF INTEGER
BPDUType ::= SEQUENCE {
   id    INTEGER,
   name OCTET STRING
}
```

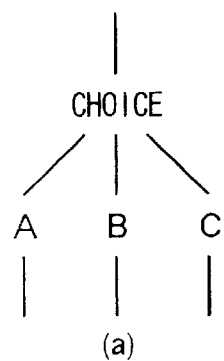
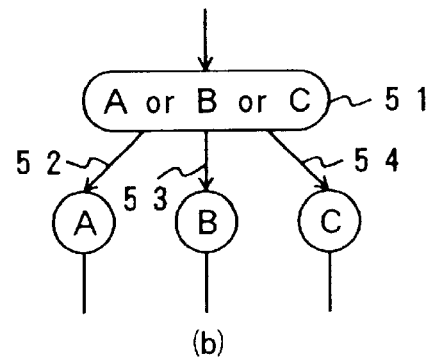
F I G. 1 1
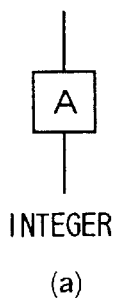
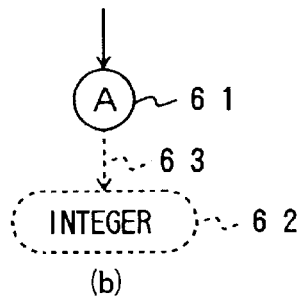
F I G. 1 2
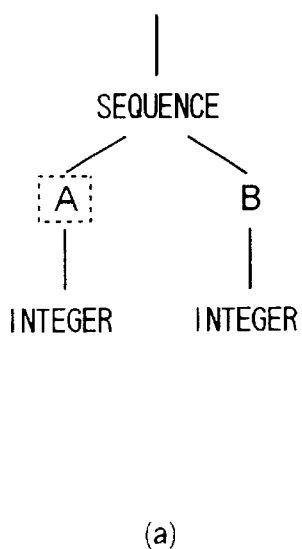
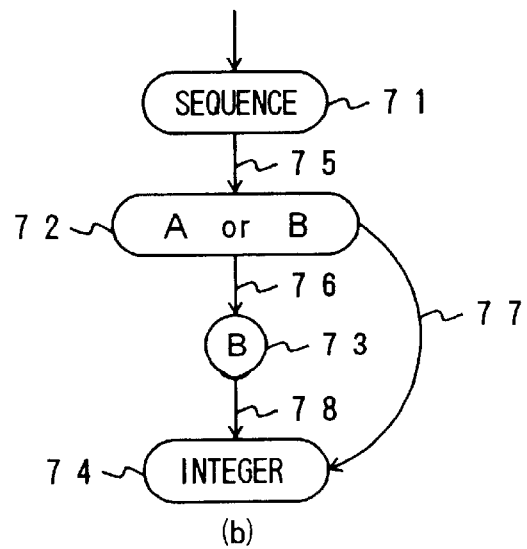
F I G. 1 3

```
PDU ::= SEQUENCE {
  id                    INTEGER,
  subid   [0] IMPLICIT  INTEGER OPTIONAL,
  length  [1] IMPLICIT  INTEGER,
  content               SEQUENCE {
    name                Printable String,
    age                 INTEGER
  },
  trailer               OCTET STRING
}
```

DECODER USING A FINITE STATE MACHINE IN DECODING AN ABSTRACT SYNTAX NOTATION-MESSAGE AND AN ENCODER FOR CARRYING OUT ENCODING OPERATION AT A HIGH SPEED

BACKGROUND OF THE INVENTION

This invention relates to a message decoder for use in decoding an encoded message which is obtained by encoding, according to the Basic Encoding Rule (hereinafter called BER) and other encoding rules, an objective message defined by an abstract syntax description described in accordance with the Abstract Syntax Notation of, for example, the Abstract Syntax Notation 1 (hereinafter called ASN.1).

This invention also relates to a message encoder for use in encoding, according to the BER and other encoding rules, the objective message defined by the abstract syntax description described in accordance with the Abstract Syntax Notation.

Traditionally, a message decoder of the type is used in decoding an encoded message produced from a message encoder of the type by encoding a transmission message as the encoded message so as to be able to carry out, in communication between heterogeneous apparatuses, data transmission/reception independently of a network. Encoding and decoding procedures or routines used herein are based on the standard determined by the International Organization for standardization (hereinafter called ISO). The message decoder and the message encoder are applicable over a very wide range and widely used in various fields such as a message handling system, a file transfer system, and a network management.

As will later be described, conventional message decoders and conventional message encoders have disadvantages.

SUMMARY OF THE INVENTION

It is an object of this invention to provide a message decoder which has a decoding function considering a syntax description defining a message and which is small in size.

It is another object of this invention to provide a message decoder of the type described, which uses a finite state machine in decoding an abstract syntax notation-message.

It is a further object of this invention to provide a message encoder capable of suppressing an increase in scale of the encoder and of carrying out an encoding operation at a high speed.

A message decoder to which this invention is applicable includes a message decoding section supplied with an encoded message given by encoding, according to the Basic Encoding Rule, an objective message defined by an abstract syntax description described in accordance with the Abstract Syntax Notation. The message decoding section decodes the encoded message into a decoded message corresponding to the objective message.

According to this invention, the message decoder comprises: a finite state machine generator comprising a parse tree generating section supplied with the abstract syntax description for generating a parse tree corresponding to the abstract syntax description and a finite state machine generating section connected to the parse tree generating section for generating a finite state machine on the basis of the parse tree. The message decoding section is connected to the finite state machine generating section to decode the encoded message into the decoded message by the use of the finite state machine.

A finite state machine generator to which this invention is applicable is for use in combination with a message decoder including a message decoding section supplied with an encoded message given by encoding, according to the Basic Encoding Rule, an objective message defined by an abstract syntax description described in accordance with the Abstract Syntax Notation. The message decoding section decodes the encoded message into a decoded message corresponding to the objective message.

According to this invention, the finite state machine generator comprises: a parse tree generating section supplied with the abstract syntax description for generating a parse tree corresponding to the abstract syntax description; and a finite state machine generating section connected to the parse tree generating section and the message decoding section for generating a finite state machine on the basis of the parse tree to make the message decoding section decode the encoded message into the decoded message by the use of the finite state machine.

Preferably, the finite state machine generating section generates, for a CHOICE node in the parse tree, a state of waiting for all tags representative of direct child nodes of the CHOICE node, and generates different transitions responsive to input of the tags, respectively.

Alternatively, the finite state machine generating section inhibits, for an IMPLICIT-declared node in the parse tree, generation of a state corresponding to a direct child node of the IMPLICIT-declared node.

As a further alternative, the finite state machine generating section generates, for an OPTIONAL-declared node in the parse tree, a transition upon presence of an input corresponding to an OPTIONAL-declared component in the syntax description, and generates another transition upon absence of the input corresponding to the OPTIONAL-declared component in the syntax description.

A message encoder to which this invention is applicable is for producing an encoded message by encoding, according to the Basic Encoding Rule, an objective message having input data defined by an abstract syntax description described in accordance with the Abstract Syntax Notation. The message encoder includes parse tree data storing means for preliminarily storing parse tree data produced from the abstract syntax description.

According to this invention, the message encoder comprises: parse tree scanning means connected to the parse tree data storing means and supplied with the objective message for scanning, as scanned data, the parse tree data successively from a root node of the parse tree data in a depth first order (or along a direction of depth of the parse tree data) on the basis of the input data of the objective message to produce, as the encoded message, encoded data corresponding to the input data which are determined by the scanned data; length information supplying means connected to the parse tree scanning means for supplying, when the parse tree scanning means does not identify at a time the length of a value field of a nest level for a particular scanned datum of the scanned data, the parse tree scanning means with an unidentified length-datum representative of an unidentified length as a length field of the nest level to make the parse tree scanning means produce the unidentified length-datum as the encoded datum corresponding to the input datum which is determined by the particular scanned datum; and end information supplying means (7) for supplying, when the parse tree scanning means scans a nest end datum of the nest level as an end scanned datum of the scanned data, the parse tree scanning means with a value field end datum representative of an end of the value field of the nest level to make the parse tree scanning means produce the value field end datum following the encoded datum corresponding to the input datum which is determined by the end scanned datum.

Preferably, the parse tree scanning means specifies the particular scanned datum when the parse tree scanning means judges that a tag for the particular scanned datum is of a constructed type.

In this event, the parse tree scanning means creates, when the parse tree scanning means specifies the particular scanned datum, a tag datum representative of the tag of the constructed type as a tag field of the nest level and produces a combination of the tag datum and the unidentified length-datum following the tag datum as the encoded datum corresponding to the input datum which is determined by the particular scanned datum.

BRIEF DESCRIPTION OF THE DRAWING

FIG. 2 is a view showing an abstract syntax description defining a protocol data unit of a presentation layer protocol and a remote operation service protocol of an OSI;

FIG. 3 is a view following FIG. 2 and showing the abstract syntax description defining the protocol data unit of the presentation layer protocol and the remote operation service protocol of the OSI;

FIG. 4 is a view showing one example of the value notation protocol data unit defined by the descriptions illustrated in FIGS. 2 and 3;

FIG. 11 is a view showing correspondence between a CHOICE node in the parse tree and states of the finite state machine;

FIG. 12 is a view showing correspondence between an IMPLICIT node in the parse tree and states of the finite state machine;

FIG. 13 is a view showing correspondence between an OPTIONAL node in the parse tree and states of the finite state machine;

DESCRIPTION OF THE PREFERRED EMBODIMENTS

Prior Art of Message Decoders

Figure 1:
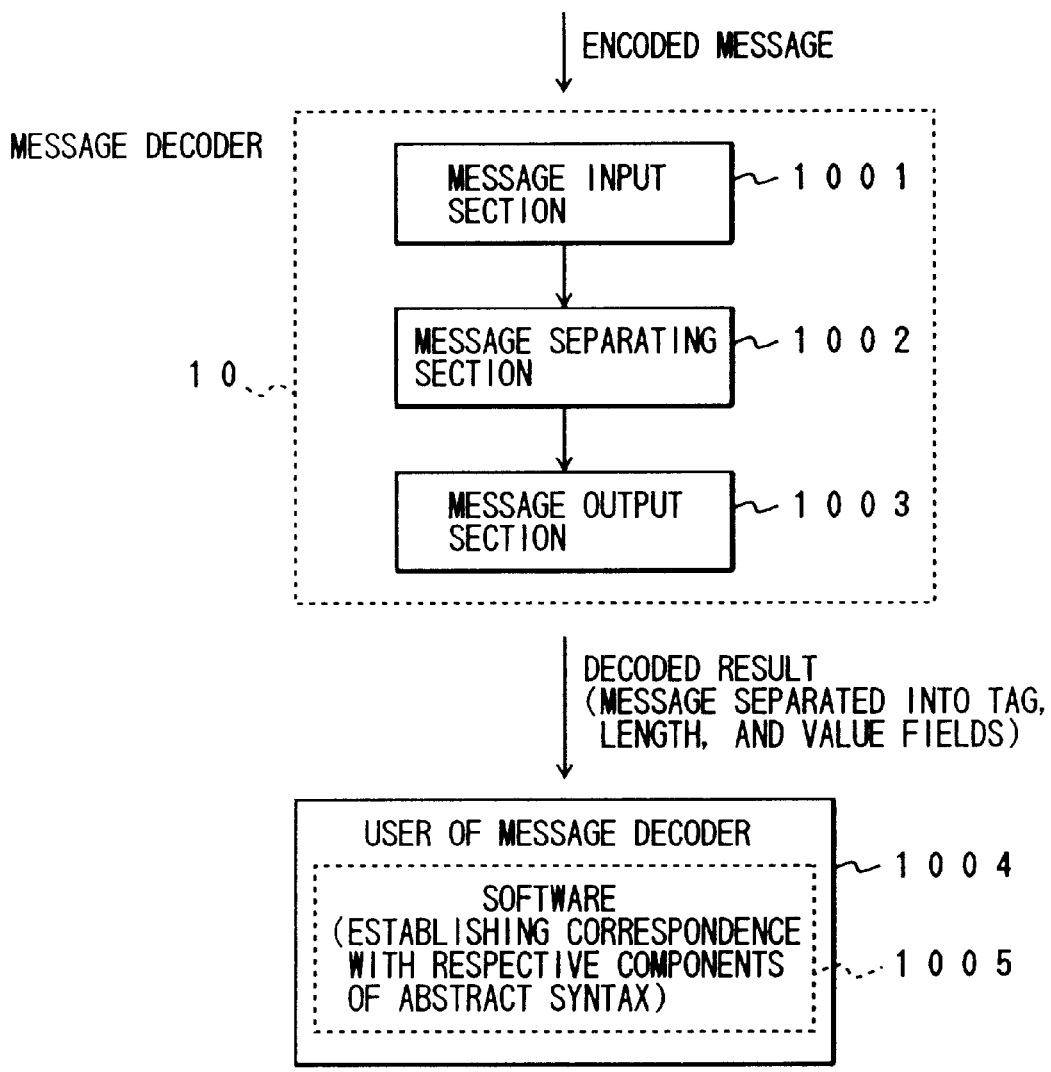
FIG. 1 is a block diagram showing the structure of a conventional message decoder.

Conventional message decoders will first be described for a better understanding of message decoders of this invention.

A message decoder is generally implemented by software No decoder carries out decoding by hardware. As a trial for decoding by hardware approach, a VASN1 is disclosed in Computer Communications, Vol. 16, No. 4, pp. 229–240, April 1993. The VASN1 has both of encoding and decoding functions but, for decoding, carries out no more than separation of the message into tag, length, and value fields. Furthermore, these functions are not completely implemented by hardware but are partially implemented as software which operates on a Central Processing Unit (hereinafter abbreviated to CPU).

Herein, one example of conventional message decoders will be described with reference to the drawing.

Figure 5:
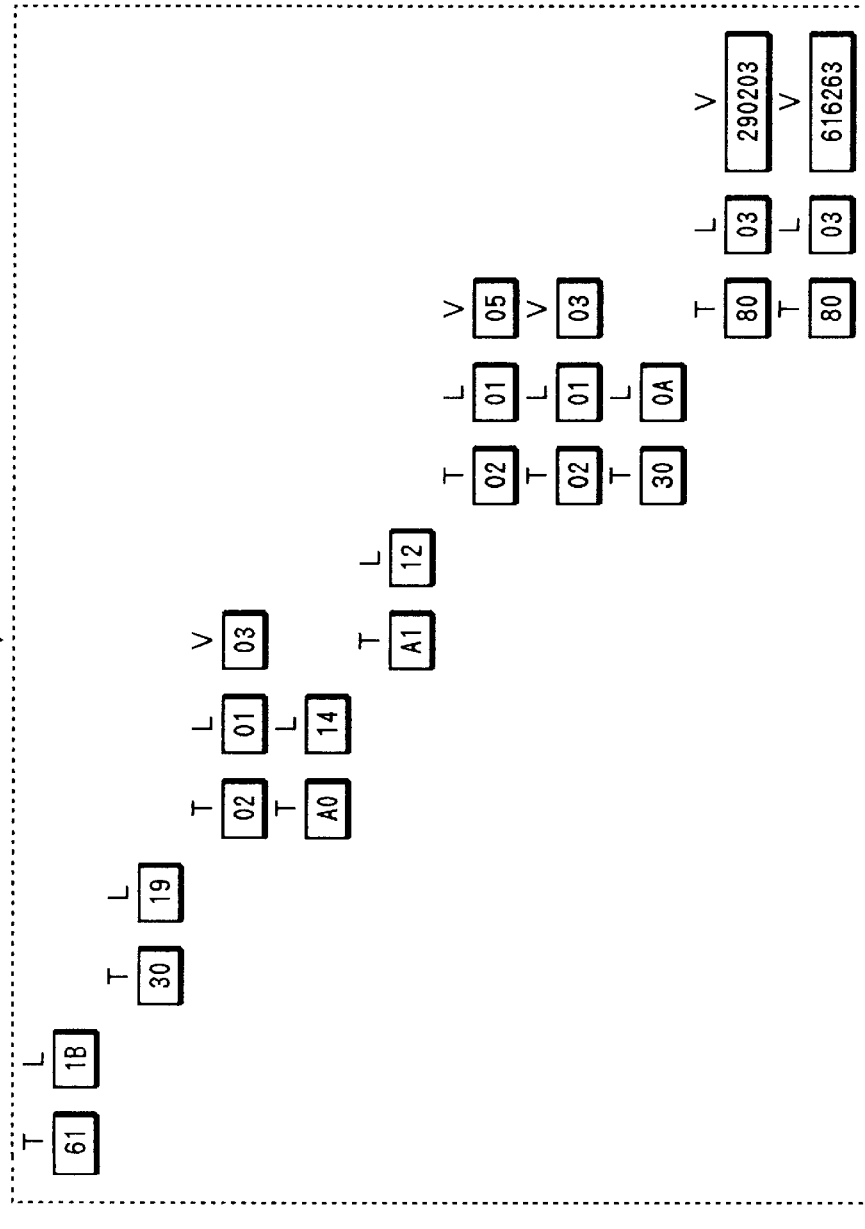
FIG. 5 is a view showing one example of a decoded result obtained by the conventional message decoder.

FIG. 1 shows the structure of the conventional message decoder. FIGS. 2 and 3 show an example of an ASN.1 description. The description illustrated in FIGS. 2 and 3 define a Protocol Data Unit (hereinafter abbreviated to PDU) of a presentation layer and PDU of a Remote Operation Service (hereinafter abbreviated to ROS) protocol. FIG. 4 shows the PDU defined in accordance with the description in FIGS. 2 and 3. FIG. 4 illustrates specific values of components defining the PDU as user-data. For example, a presentation-context-identifier has a value "3" while an operation-value has a value "3" in localValue. FIG. 5 shows an encoded message which is obtained by encoding the PDU defined in accordance with the description illustrated in FIGS. 2 and 3, and a decoded result in case where the encoded message is supplied to the conventional message decoder.

As illustrated in FIG. 1, the conventional message decoder depicted at 10 comprises a message input section 1001, a message separating section 1002, and a message output section 1003. The message input section 1001 receives the encoded message and delivers the encoded message to the message separating section 1002. The message separating section 1002 separates the encoded message into the tag, the length, and the value fields. Supplied from the message separating section 1002 with a decoded message thus obtained, the message output section 1003 delivers the decoded message to a user 1004 (software 1005 on the CPU) of the message decoder.

Herein, a decoding operation in the message decoder 10 is to separate the encoded message into the tag, the length, and the value fields. Correspondence between each component of the ASN.1 description and a value of the decoded result (for example, correspondence between an invokeID of ROIVapdu and the value of an INTEGER type in FIGS. 2 and 3) must be established by the user 1004 of the message decoder.

As illustrated in FIG. 5, the encoded message is separated by the message separating section 1002 into the tag, the length, and the value fields. In FIG. 5, those fields labelled T, L, and V represent the tag field, the length field, and the value field, respectively.

The message decoder 10 at first examines a third significant bit of a first octet of the message. If this bit has a value "1", judgement is made that the message is of a constructed type (tag, length, and value fields are again included in the value field). If this bit has a value "0", judgement is made that the message is of a primitive type (the value field represents a value itself). Upon judgement of the constructed type, the tag and the length fields are outputted. Thereafter, a third significant bit of a next input octet is examined to judge whether or not it is of the constructed type. If it is of the constructed type, separation is recursively performed.

Upon judgement of the primitive type, the value field is outputted and the third significant bit of the next input octet is examined. In FIG. 5, the first octet is '61' in hexadecimal notation ('01100001' in binary notation) and its third significant bit has a value "1". Therefore, the tag field '61' in hexadecimal notation and the length field '1B' in hexadecimal notation are outputted. The next octet is '30' in hexadecimal notation ('00110000' in binary notation) and its third significant bit has a value "1". Therefore, the tag field '30' in hexadecimal notation and the length field '19' in hexadecimal notation are outputted. Furthermore, the following octet is '02' in hexadecimal notation ('00000010' in binary notation) and its third significant bit has a value "0". Therefore, the tag field '02' in hexadecimal notation, the length field '01' in hexadecimal notation, and the value field '03' in hexadecimal notation are outputted. In the similar manner, subsequent octets are continuously processed.

The user 1004 of the message decoder 10 can not directly use the decoded result of the message decoder 10 as it is. In this connection, the user 1004 of the message decoder 10 contains the software 1005 generated from the ASN.1 descriptions by the use of an ASN.1 compiler. The software 1005 has a function of establishing correspondence between the components of the ASN.1 descriptions and the decoded result of the message decoder 10. In case where the software generated from the description illustrated in FIGS. 2 and 3 is supplied with the result (the message separated into the tag, the length, and the value fields) of decoding the PDU in FIG. 4, the values '03', '05', and '03' in hexadecimal notation are made to correspond to the presentation-context-identifier, the invokeID, and the operation-value, respectively.

Upon decoding, the conventional message decoder performs no more than simple decoding such that the encoded message is separated into three fields including the tag, the length, and the value fields. Thus, it is impossible to perform decoding considering the syntax description defining the message. Herein, the decoding considering the syntax description defining the message is not that the separated fields are simply outputted as the decoded result, but that corresponding values are outputted for the respective components of the message defined by the syntax description, respectively.

The conventional message decoder can not perform the decoding considering the syntax description defining the message. As a result, such operation must be carried out by the user of the message decoder. Disadvantageously, this increases an overhead at the user.

Moreover, the conventional message decoder intends to process all messages defined by the syntax descriptions. Therefore, in order to perform the decoding considering the syntax descriptions, the decoder must store information for performing the decoding operation of the messages defined by all syntax descriptions. Accordingly, in order to enable the conventional message decoder to perform the decoding considering the syntax descriptions defining the message, the decoder inevitably becomes very large in scale. Thus, the decoder of a very large scale is required and is difficult to be realized.

In addition, the ASN.1 compiler generating from the ASN.1 descriptions a data structure for the encoding and the decoding operations assumes message encoding and decoding by software approach. After generation of the parse tree, it is converted into the data structure (definition of a struct entity in the C language) for software. With respect to the decoding by hardware approach, it is impossible to directly use by hardware the definition of the constructed entity in the C language. It is therefore necessary to convert the ASN.1 descriptions into a format adapted to hardware. In other words, in order to perform the decoding by hardware approach, the technique of the ASN.1 compiler can not straightforwardly be applied.

Message Decoders of This Invention

This invention provides a message decoder which has a decoding function considering the syntax description defining a message and which is small in scale.

A message decoder according to this invention can perform, with a small scale, decoding considering the syntax description defining a message to be decoded, by the use of a finite state machine generated from an ASN.1 description defining the message.

Specifically, a message decoder according to this invention comprises a message input section for receiving an encoded message to deliver the encoded message to a message decoding section. The message decoding section comprises a finite state machine generated from the ASN.1 description. The message decoding section performs decoding considering the syntax description by the use of the finite state machine. A decoded message is delivered by a message output section to a user of the message decoder.

The above-mentioned finite state machine is generated by a finite state machine generator. The finite state machine generator comprises a parse tree generating section supplied with, for example, the ASN.1 description for generating a parse tree corresponding to the description, and a finite state machine generating section for generating the finite state machine in correspondence to the parse tree.

In this invention, it is possible not only to reduce the scale of the decoder by restricting the syntax to be decoded but also to perform the decoding considering the syntax description defining the message. In addition, the finite state machine generator can convert any desired ASN.1 description into the finite state machine. This makes it possible to flexibly cope with various definitions of the message.

Now, description will be made about this invention with reference to the drawing.

Figure 6:
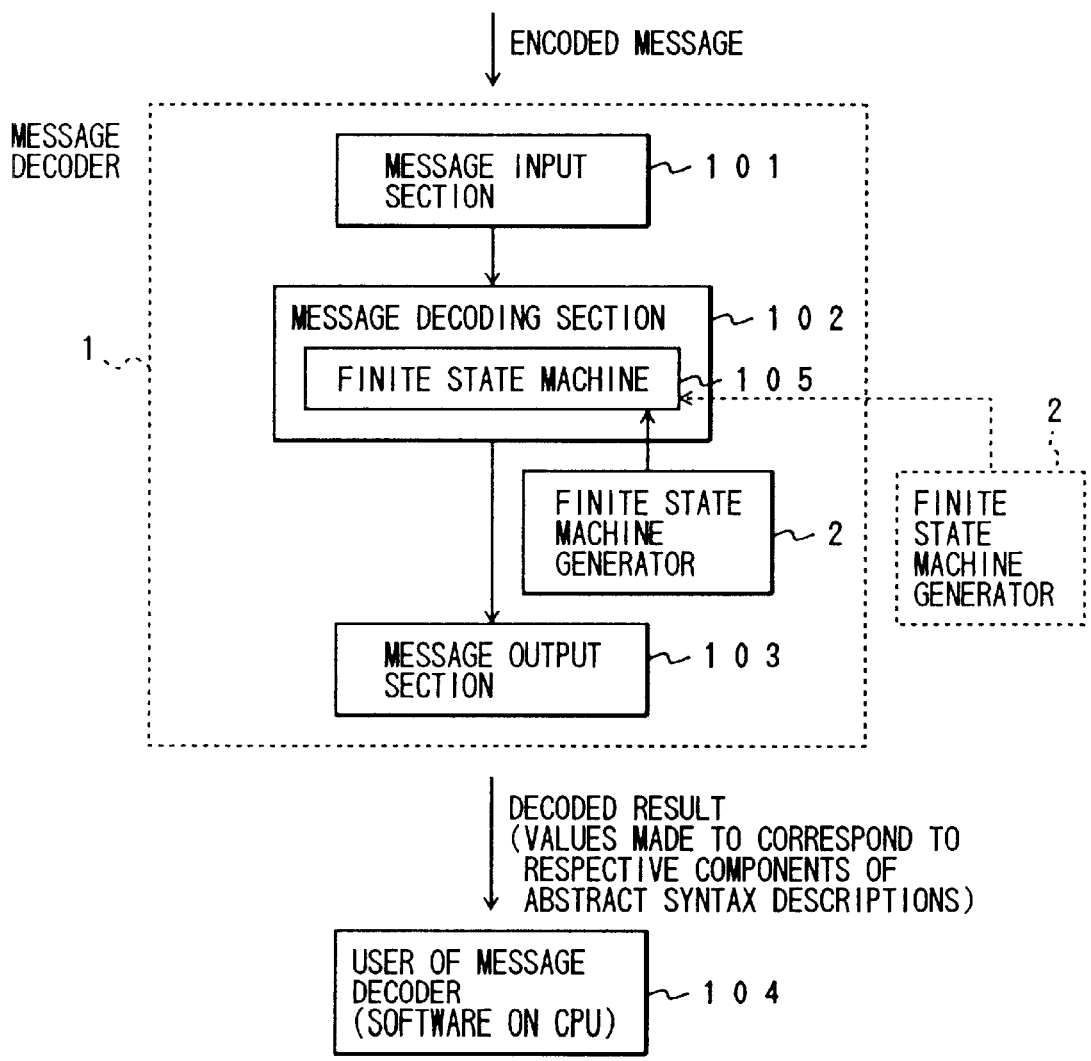
FIG. 6 is a block diagram of a message decoder according to one embodiment of this invention.

FIG. 6 is a block diagram illustrating a message decoder according to a first embodiment of this invention. The message decoder 1 comprises a message input section 101, a message decoding section 102, and a message output section 103. The message input section 101 receives an encoded message and delivers the encoded message to the message decoding section 102. Herein, the message is encoded in accordance with BER in ASN.1. The message decoding section 102 contains a finite state machine 105 and has a function to perform decoding considering the ASN.1 description by the use of the finite state machine 105. The message output section 103 receives a decoded result from the message decoding section 102 and delivers the decoded result to a user 104 (software operating on a CPU) of the decoder.

The finite state machine 105 is generated by a finite state machine generator 2 included in the message decoder 1. Alternatively, the message decoder 1 may be cooperative with the finite state machine generator 2 which is disposed outside the message decoder 1 in the manner depicted by a broken line.

When the encoded message arrives at the message decoder 1, the encoded message is received by the message input section 101. The encoded message thus received is delivered to the message decoding section 102. Supplied with the encoded message, the message decoding section 102 performs, by the use of the finite state machine 105, the decoding considering the syntax description defining the message.

Figures 7, 8:
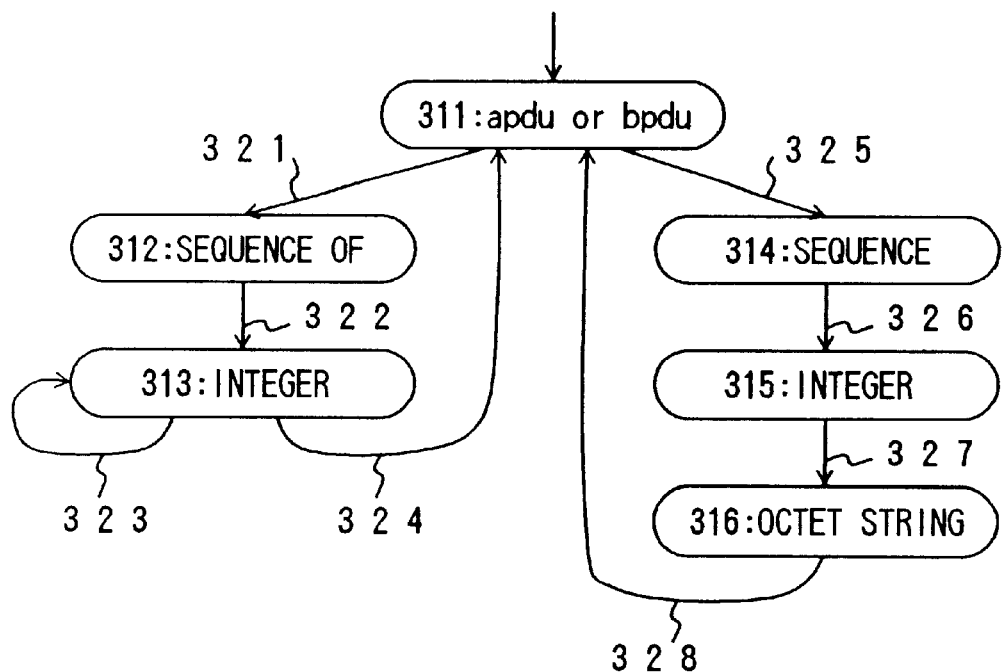
FIG. 7 is a view showing one example of an abstract syntax description.
FIG. 8 is a view showing state transitions of a finite state machine generated from a parse tree (later illustrated in FIG. 16)

In order to explain how the message is decoded by the message decoder 1, consideration is made about descriptions shown in FIG. 7 as an example of the ASN.1 description defining the message to be decoded. It is meant by the description that PDU comprises apdu or bpdu, that apdu comprises a sequence of values of an INTEGER type, and that bpdu comprises a sequence of values of the INTEGER type and an OCTET STRING type.

FIG. 8 shows a state transition diagram of the finite state machine 105 for carrying out the decoding considering the syntax description in FIG. 7. In FIG. 8, enclosures represent various states and numerals in the enclosures are state numbers. Those arrows labelled numerals 321 to 328 represent state transition numbers. An arrow not labelled with any numeral represents that the finite state machine is in an initial state 311.

The operation of the finite state machine 105 will hereafter be described. In the following description, an expression as a tag 'A1' implies that the tag has a content 'A1' (in hexadecimal notation).

At first, the finite state machine 105 is in the initial state 311 and waits for the arrival of the tag 'A1' representative of apdu or a tag 'A2' representative of bpdu. At the arrival of the tag 'A1', transition to a state 312 occurs via the arrow 321. At the arrival of the tag 'A2', transition to a state 314 occurs via the arrow 325. In the initial state 311, a length field is examined prior to the transition, whichever transition occurs. The value of the length field is stored as a remaining message length.

In the state 312, the arrival of a tag '30' representative of a SEQUENCE OF type is waited. When the tag '30' arrives in the state 312, the number of octets (sum of the number of octets of the tag field and the number of octets of the length field) supplied in the state 312 is subtracted from the remaining message length which has been stored. Then, transition to a state 313 occurs via the arrow 322.

In the state 313, the arrival of a tag '02' representative of the INTEGER type is waited. When the tag '02' arrives in the state 313, the value of the INTEGER type is outputted and the number of octets (sum of three numbers, i.e., the number of octets of the tag field, the number of octets of the length field, and the number of octets of the value of the INTEGER type) supplied in the state 313 is subtracted from the remaining message length which has been stored. When the remaining message length becomes equal to 0, return to the state 311 occurs via the arrow 324. When the remaining message length is not equal to 0, the state 313 is maintained via the arrow 323.

In the state 314, the arrival of a tag '30' representative of a SEQUENCE type is waited. When the tag '30' arrives in the state 314, the number of octets (sum of the number of octets of the tag field and the number of octets of the length field) supplied in the state 314 is subtracted from the remaining message length. Then, transition to a state 315 occurs via the arrow 326.

In the state 315, the arrival of the tag '02' representative of the INTEGER type is waited. When the tag '02' arrives in the state 315, the value of the INTEGER type is outputted and the number of octets (sum of three numbers, i.e., the number of octets of the tag field, the number of octets of the length field, and the number of octets of the value of the INTEGER type) supplied in the state 315 is subtracted from the remaining message length which has been stored. Then, transition to a state 316 occurs via the arrow 327.

In the state 316, the arrival of a tag '04' representative of the OCTET STRING type is waited. When the tag '04' arrives in the state 316, the value of the OCTET STRING type is outputted and the number of octets (sum of three numbers, i.e., the number of octets of the tag field, the number of octets of the length field, and the number of octets of the value of the OCTET STRING type) supplied in the state 316 is subtracted from the remaining message length which has been stored. Then, return to the state 311 occurs via the arrow 328.

As a result, the message decoding section 102 produces an output which is a sequence comprising the values of the INTEGER type or a sequence comprising the values of the INTEGER type and the values of the OCTET STRING type.

The message output section 103 receives the output of the message decoding section 102 and converts the output into a format easily used by the user 104 of the message decoder for delivery to the user 104 of the message decoder.

Next, description will be made about a finite state machine generator in the above-mentioned first embodiment.

Figure 9:
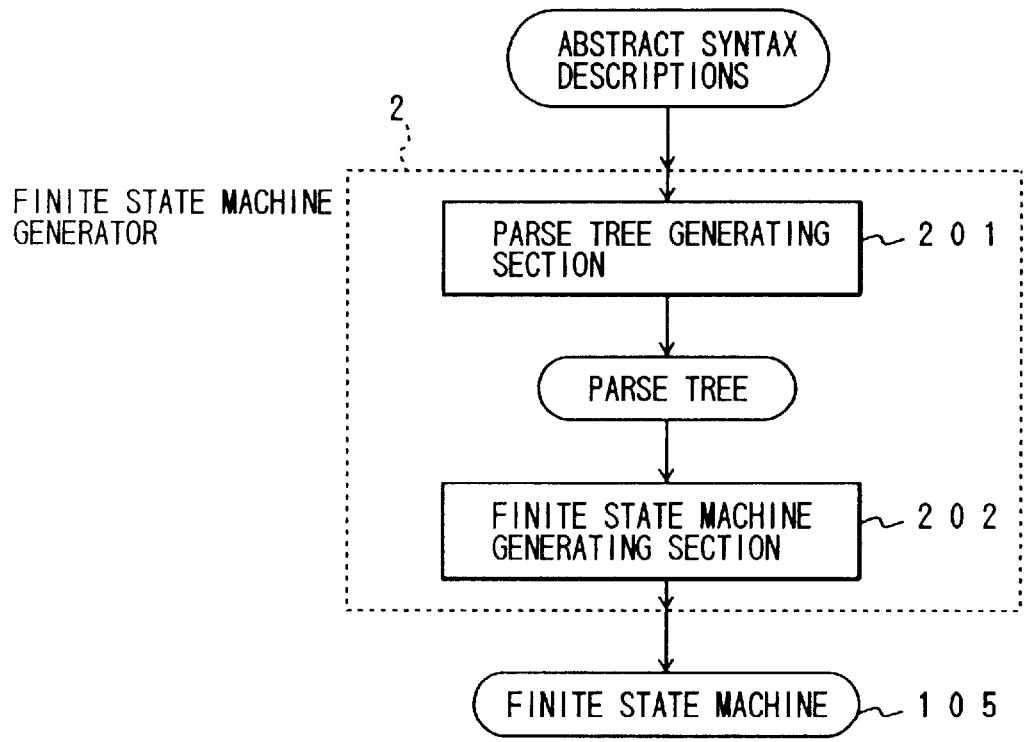
FIG. 9 is a block diagram of one example of a finite state machine generator used in the message decoder illustrated in FIG. 6.

FIG. 9 is a block diagram illustrating an example of the finite state machine generator in the first embodiment. The finite state machine generator comprises a parse tree generating section 201 and a finite state machine generating section 202.

The parse tree generating section 201 receives as an input abstract syntax description such as an ASN.1 description and performs syntactic analysis or parsing by the use of the ASN.1 compiler technique to generate a parse tree. The finite state machine generating section 202 receives as an input the parse tree thus generated, and converts the parse tree to generate the finite state machine for carrying out the decoding considering the ASN.1 description.

Now, description will be made about a message decoder according to a second embodiment of this invention.

Figure 10:
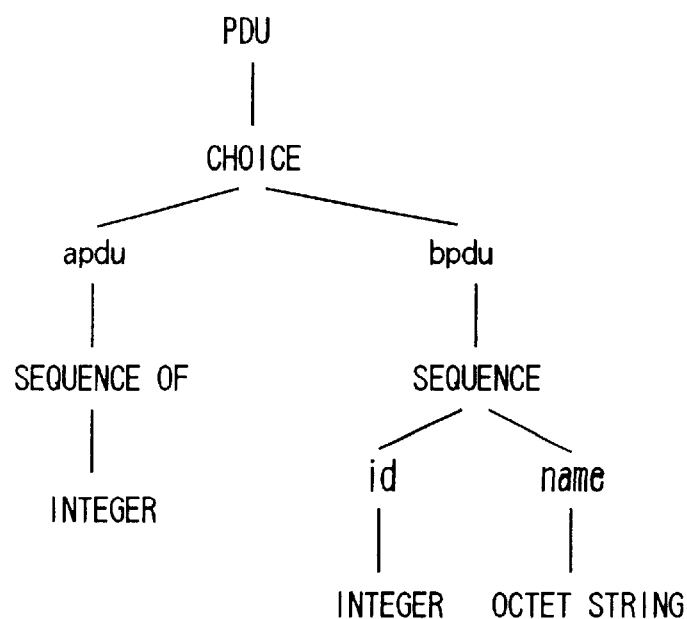
FIG. 10 in a view showing a parse tree corresponding to the description illustrated in FIG. 7.

Again in conjunction with the descriptions in FIG. 7 already used to explain the first embodiment, the function of the finite state machine generator used in the second embodiment will be described. Referring to FIG. 9 in addition, the descriptions in FIG. 7 are supplied to the parse tree generating section 201. The parse tree generating section 201 analyzes the syntax description and converts the syntax description into the parse tree as an intermediate expression. FIG. 10 shows the parse tree obtained from the description in FIG. 2. Each node of the parse tree represents the name of the component or the type of the ASN.1 description. What is meant by FIG. 10 is as follows.

PDU is of a CHOICE type (a data type such that a single one of one or more components is selected) and either one of apdu and bpdu is selected. apdu is of the SEQUENCE type (a data type which is a sequence of components of a homogeneous data type) and includes components of the INTEGER type (integer). bpdu is of the SEQUENCE OF type (a data type which is a sequence of components of a plurality of data types) and includes id and name as its components. id is of the INTEGER type while name is of the OCTET STRING type (octet sequence).

When the above-mentioned parse tree is supplied to the finite state machine generating section 202, the finite state machine generating section 202 analyzes all nodes of the parse tree and converts those nodes of the parse tree corresponding to the types of the ASN.1 descriptions into states of the finite state machine. Thus, the finite state machine is generated. If the parse tree includes a CHOICE node, the above-mentioned conversion includes production of a state of waiting for all tags representative of its direct child nodes and production of different transitions dependent upon the tags supplied, respectively.

For example, with respect to a portion of the parse tree illustrated in FIG. 11(a), a portion of the finite state machine illustrated in FIG. 11(b) is generated. In a state 51 shown in FIG. 11(b), the arrival is waited of a tag representative of A, a tag representative of B, or a tag representative of C. At the arrival of the tag representative of A, the tag representative of B, and the tag representative of C, transition is performed along an arrow 52, an arrow 53, and an arrow 54, respectively. If the parse tree includes an IMPLICIT-declared node, its direct child node is representative of a data type of the IMPLICIT-declared node. In this case, neither production of a state corresponding to the child node nor production of a transition to such state is carried out. For example, with respect to a portion of the parse tree illustrated in FIG. 12(a) (the node enclosed in a frame represents that it is declared as IMPLICIT), a portion of the finite state machine illustrated in FIG. 12(b) is generated. In FIG. 12(b), a state 62 and an arrow 63 depicted by dashed lines are not produced because the node A of the parse tree is declared as IMPLICIT.

If the parse tree includes an OPTIONAL-declared node, state transitions are produced in correspondence to presence and absence of an OPTIONAL-declared component, respectively. For example, with respect to a portion of the parse tree illustrated in FIG. 13(a) (the node enclosed by a dotted-line frame represents that it is declared as OPTIONAL), a portion of the finite state machine illustrated in FIG. 13(b) is generated. In FIG. 13(b), the tag representative of A or the tag a representative of B is waited in a state 72. This is because the A is declared as OPTIONAL so that both of A and B may possibly arrive. If the tag representative of A arrives, the tag representative of B will arrive next. Therefore, transition to a state 73 occurs via an arrow 76 to wait the tag representative of B. If the tag representative of B arrives, the tag representative of INTEGER will arrive next. Therefore, transition to a state 74 occurs via an arrow 77.

In the above-mentioned manner, two kinds of transitions are produced in correspondence to presence and absence of the OPTIONAL-declared component. FIG. 8 shows the finite state machine obtained from the parse tree in FIG. 10.

Thus, by the use of the finite state machine generated from the ASN.1 descriptions by the finite state machine generator 2, the decoding considering the syntax descriptions defining the message is performed.

In the above-mentioned embodiments, description has been exclusively made about the case where the message defined by ASN.1 is encoded in accordance with BER (where the encoded message comprises the three fields including the tag, the length, and the value fields). However, by modifying the finite state machine generating section, it is possible to form a message decoder for a massage comprising two fields including a header field and a value field.

Now, description will be made about an operation (hereafter called an operation (1)) of acquiring, through a PDU of a presentation layer standardized by ISO as Open Systems Interconnection (hereinafter abbreviated to OSI) and a PDU of a ROS protocol, an invoke identifier (invokeID) of Common Management Information Protocol (hereinafter abbreviated to CMIP). a kind of operation (operation-value), and an argument of operation (argument).

Figure 14:
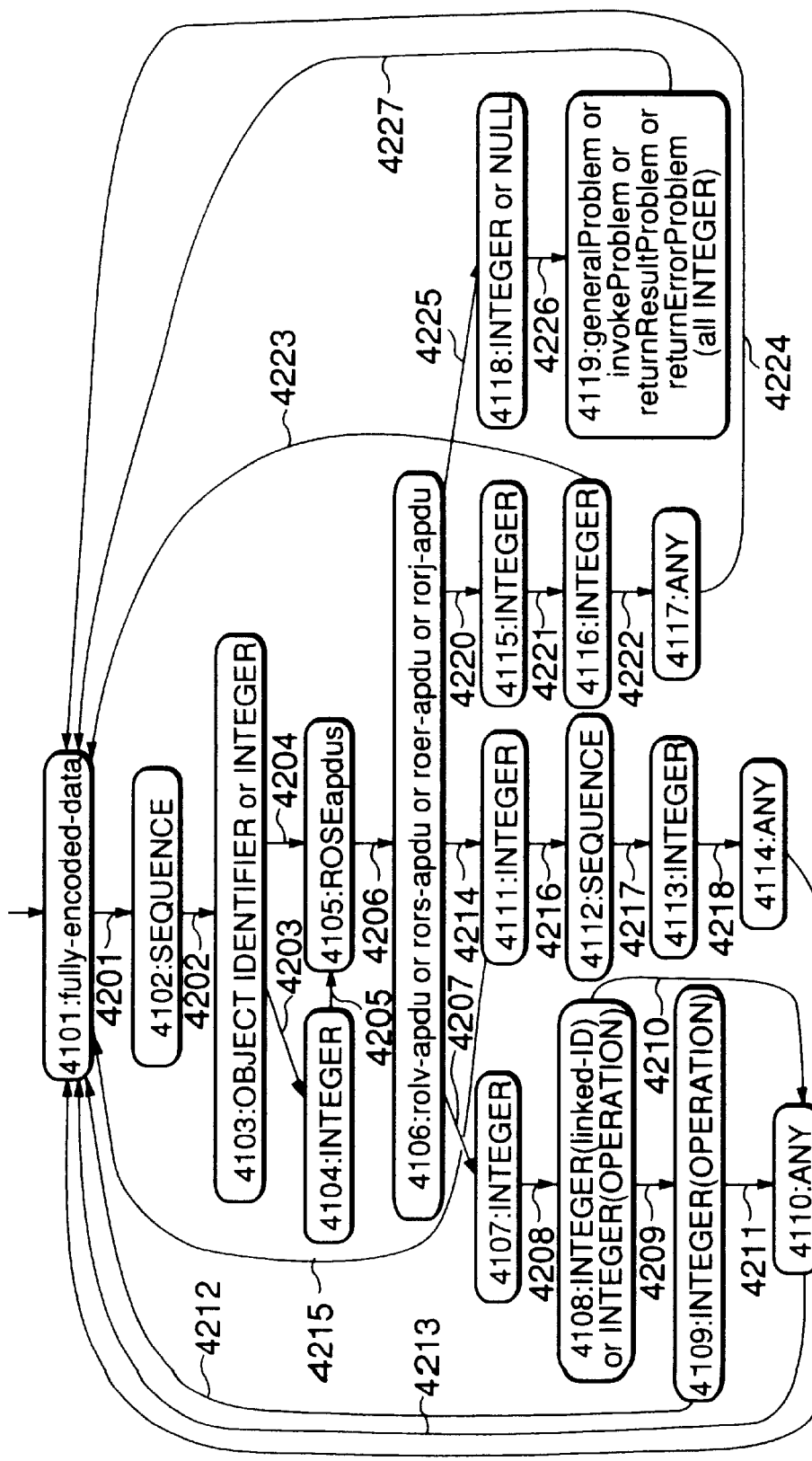
FIG. 14 is a view showing state transitions of a finite state machine generated from a parse tree (later illustrated in FIG. 16)

The operation (1) in the first embodiment will be described in conjunction with FIGS. 6, 14, 15, 2, and 3. In FIG. 14, numerals in enclosures and numerals affixed to arrows represent the state numbers and the state transition numbers, respectively, in the manner similar to FIG. 8.

FIGS. 2 and 3 show the ASN.1 description defining the PDU of the presentation layer and the PDU of the ROS protocol, as described above. What is meant by the description is as follows.

User-data comprises either one of simply-encoded-data of the OCTET STRING type and fully-encoded-data of a Fully-encoded-data type. The Fully-encoded-data type comprises a sequence of values of a PDV-list type. The PDV-list type comprises transfer-syntax-name of an OBJECT IDENTIFIER type as a component which may not be present, presentation-context-identifier of the INTEGER type, and presentation-data-values comprising either one of single-ASN1-type of an ANY type, octet-aligned of the OCTET STRING type, and arbitrary of a BIT STRING type. ROSEapdus as the PDU of the ROS protocol is stored in single-ASN1-type mentioned above.

ROSEapdus comprises either one of roiv-apdu of a ROIVapdu type, rors-apdu of a RORSapdu type, roer-apdu of a ROERapdu type, and rorj-apdu of a RORJapdu type. The ROIVapdu type comprises a sequence of components including invokeID of an InvokeIDType type, linked-ID of the InvokeIDType type as a component which may not be present, operation of an OPERATION type, and argument of the ANY type. The RORSapdu type comprises a sequence of components including invokeID of the InvokeIDType type and result which is a sequence of components including operation-value of the OPERATION type and result of the ANY type. result is an element which may not be present. The ROERapdu type comprises a sequence of components including invokeID of the InvokeIDType type, error-value of an ERROR type, and parameter of the ANY type. RORJapdu comprises invokeID comprising either one of invokeIDType of the InvokeIDType type and null of a NULL type, and problem comprising one of generalProblem of a GeneralProblem type, invokeProblem of an InvokeProblem type, returnResultProblem of a ReturnResultProblem type, and returnErrorProblem of a ReturnErrorProblem type. Each of the InvokeIDType type, the OPERATION type, the ERROR type, the GeneralProblem type, the InvokeProblem type, the ReturnResultProblem type, and the ReturnErrorProblem type is of the INTEGER type.

The message decoder I illustrated in FIG. 6 decodes the message by the use of the finite state machine 105 represented by the state transition diagram illustrated in FIG. 14. Hereinafter, description will be made about how the state transition is performed by the finite state machine 105 during the decoding operation. In the following description, an expression as a tag 'A1' means that the tag has a content 'A1' (hexadecimal notation).

At first, the finite state machine 105 is in an initial state 4101 and waits the arrival of a tag '61' representative of fully-encoded-data. Herein, simply-encoded-data is ignored because the PDU of the ROS protocol is not stored in simply-encoded-data. When the tag '61' arrives in the state 4101, transition to a state 4102 occurs via an arrow 4201. In the initial state 4101, a length field is examined prior to execution of the transition and the value of this field is stored as a remaining message length.

In the state 4102, the arrival of a tag '30' representative of the SEQUENCE type is waited. If the tag '30' arrives in the state 4102, the number of octets (sum of the number of octets of the tag field and the number of octets of the length field) supplied in the slate 4102 is subtracted from the remaining message length which has been stored. Then, transition to a state 4103 occurs via an arrow 4202.

In the state 4103, the arrival of a tag '06' representative of the OBJECT IDENTIFIER type or a tag '02' representative of the INTEGER type is waited. If the tag '06' arrives in the state 4103, the value of the OBJECT IDENTIFIER type is outputted and the number of octets (sum of three numbers, i.e., the number of octets of the tag field, the number of octets of the length field, and the number of octets of the value of the OBJECT IDENTIFIER type) supplied in the state 4103 is subtracted from the remaining message length which has been stored. Then, transition to a state 4104 occurs via an arrow 4203. If the tag '02' arrives in the state 4103, the value of the INTEGER type is outputted and the number of octets (sum of three numbers, i.e., the number of octets of the tag field, the number of octets of the length field, and the number of octets of the value of the INTEGER type) supplied in the state 4103 is subtracted from the remaining message length which has been stored. Then, transition to a state 4105 occurs via an arrow 4204.

In the state 4104, the arrival of the tag '02' representative of the INTEGER type is waited. If the tag '02' arrives in the state 4104, the value of the INTEGER type is outputted and the number of octets (sum of three numbers, i.e., the number of octets of the tag field, the number of octets of the length field, and the number of octets of the value of the INTEGER type) supplied in the state 4104 is subtracted from the remaining message length which has been stored. Then, transition to a state 4105 occurs via an arrow 4205.

In the state 4105, the arrival of a tag 'A0' representative of ROSEapdus is waited. If the tag 'A0' arrives in the state 4105, the number of octets (sum of the number of octets of the tag field and the number of octets of the length field) supplied in the state 4105 is subtracted from the remaining message length which has been stored. Then, transition to a state 4106 occurs via an arrow 4206.

In the state 4106, the arrival of a tag 'A1' representative of roiv-apdu, a tag 'A2' representative of rors-apdu, a tag 'A3' representative of roer-apdu, or a tag 'A4' representative of rorj-apdu is waited. If the tag 'A1' arrives in the state 4106, transition to a state 4107 occurs via an arrow 4207. If the tag 'A2' arrives in the state 4106, transition to a state 4111 occurs via an arrow 4214. If the tag 'A3' arrives in the state 4106, transition to a state 4115 occurs via an arrow 4220. If the tag 'A4' arrives in the state 4106, transition to a state 4118 occurs via an arrow 4225. Upon execution of any one of the above-mentioned transitions, the number of octets (sum of the number of octets of the tag field and the number of octets of the length field) supplied in the state 4106 is subtracted from the remaining message length which has been stored, prior to execution of the transition.

In the state 4107, the arrival of the tag '02' representative of the INTEGER type is waited. If the tag '02' arrives in the state 4107, the value of the INTEGER type is outputted as the value of invokeID and the number of octets (sum of three numbers, i.e., the number of octets of the tag field, the number of octets of the length field, and the number of octets of the value of the INTEGER type) supplied in the state 4107 is subtracted from the remaining message length which has been stored. Then, transition to a state 4108 occurs via an arrow 4208.

In the state 4108, the arrival of a tag '80' representative of the INTEGER type (linked-ID) or the tag '02' representative of the INTEGER type (OPERATION) is waited. If the tag '80' arrives in the state 4108, the value of the INTEGER type is outputted as the value of linked-ID and transition to a state 4109 occurs via an arrow 4209. If the tag '02' arrives in the state 4108, the value of the INTEGER type is outputted as the value of OPERATION and transition to a state 4110 occurs via an arrow 4210. In case of either transition, the number of octets (sum of three numbers, i.e., the number of octets of the tag field, the number of octets of the length field, and the number of octets of the value of the INTEGER type) supplied in the state 4108 is subtracted from the remaining message length which has been stored, prior to execution of the transition.

In the state 4109, the arrival of the tag '02' representative of the INTEGER type (OPERATION) is waited. If the tag '02' arrives in the state 4109, the value of the INTEGER type in outputted as the value of OPERATION and the number of octets (sum of three numbers, i.e., the number of octets of the tag field, the number of octets of the length field, and the number of octets of the value of the INTEGER type) supplied in the state 4109 is subtracted from the remaining message length which has been stored. If the remaining message length in not equal to "0", transition to the state 4110 occurs via an arrow 4211. If the remaining message length is equal to "0" and absence of the data of the ANY type is revealed, return to the state 4101 occurs via an arrow 4212.

In the state 4110, the arrival of the data of the ANY type is waited. If the data of the ANY type arrives in the state 4110, the data are outputted and the remaining message length which has been stored is reset into "0". Then, return to the state 4101 occurs via an arrow 4213.

In the state 4111, the arrival of the tag '02' representative of the INTEGER type is waited. If the tag '02' arrives in the state 4111, the value of the INTEGER type is outputted as the value of invokeID and the number of octets (sum of three numbers, i.e., the number of octets of the tag field, the number of octets of the length field, and the number of octets of the value of the INTEGER type) supplied in the state 4111 is subtracted from the remaining message length which has been stored. If the remaining message length is not equal to "0", transition to a state 4112 occurs via an arrow 4216. If the remaining message length is equal to "0" and absence of subsequent data is revealed, return to the state 4101 occurs via an arrow 4215.

In the state 4112, the arrival of the tag '30' representative of the SEQUENCE type is waited. If the tag '30' arrives in the state 4112, the number of octets (sum of the number of octets of the tag field and the number of octets of the length field) supplied in the state 4112 is subtracted from the remaining message length which has been stored. Then, transition to a state 4113 occurs via an arrow 4217.

In the state 4113, the arrival of the tag '02' representative of the INTEGER type is waited. If the tag '02' arrives in the state 4113, the value of the INTEGER type is outputted as the value of operation-value and the number of octets (sum of three numbers, i.e., the number of octets of the tag field, the number of octets of the length field, and the number of octets of the value of the INTEGER type) supplied in the state 4113 is subtracted from the remaining message length which has been stored. Then, transition to a state 4114 occurs via an arrow 4218.

In the state 4114, the arrival of the data of the ANY type is waited. If the data of the ANY type arrives in the state 4114, the data are outputted and the remaining message length which has been stored is reset into "0". Then, return to the state 4101 occurs via an arrow 4219.

In the state 4115, the arrival of the tag '02' representative of the INTEGER type is waited. If the tag '02' arrives in the state 4115, the value of the INTEGER type is outputted as the value of invokeID and the number of octets (sum of three numbers, i.e., the number of octets of the tag field, the number of octets of the length field, and the number of octets of the value of the INTEGER type) supplied in the state 4115 is subtracted from the remaining message length which has been stored. Then, transition to a state 4116 occurs via an arrow 4221.

In the state 4116, the arrival of the tag '02' representative of the INTEGER type is waited. If the tag '02' arrives in the state 4116, the value of the INTEGER type is outputted as the value of error-value and the number of octets (sum of three numbers, i.e., the number of octets of the tag field, the number of octets of the length field, and the number of octets of the value of the INTEGER type) supplied in the state 4116 is subtracted from the remaining message length which has been stored. If the remaining message length is not equal to "0", transition to a state 4117 occurs via an arrow 4222. If the remaining message length is equal to "0" and absence of the data of the ANY type is revealed, return to the state 4101 occurs via an arrow 4223.

In the state 4117, the arrival of the data of the ANY type is waited. If the data of the ANY type arrives in the state 4117, the data are outputted and the remaining message length which has been stored is reset into "0". Then, return to the state 4101 occurs via an arrow 4224.

In the state 4118, the arrival of the tag '02' representative of the INTEGER type or a tag '05' representative of the NULL type is waited. If the tag '02' arrives in the state 4118, the value of the INTEGER type is outputted as the value of invokeID and the number of octets (sum of three numbers, i.e., the number of octets of the tag field, the number of octets of the length field, and the number of octets of the value of the INTEGER type) supplied in the state 4118 is subtracted from the remaining message length which has been stored. If the tag '05' arrives in the state 4118, NULL is outputted as the value of invokeID and the number of octets (sum of three numbers, i.e., the number of octets of the tag field, the number of octets of the length field, and the number of octets of the value of the NULL type) supplied in the state 4118 is subtracted from the remaining message length which has been stored. In either event, transition to a state 4119 occurs via an arrow 4226.

In the state 4119, the arrival of a tag 'A0' representative of generalProblem, a tag 'A1' representative of invokeProblem, a tag 'A2' representative of returnResultProblem, or a tag 'A3' representative of returnErrorProblem is waited. If any one of the above-mentioned tags arrives in the state 4119, the value of the INTEGER type is outputted as the value of problem and the remaining message length which has been stored is reset into "0". Then, return to the state 4101 occurs via an arrow 4227.

As described above, the value of the INTEGER type or the ANY type is outputted.

Figure 15:
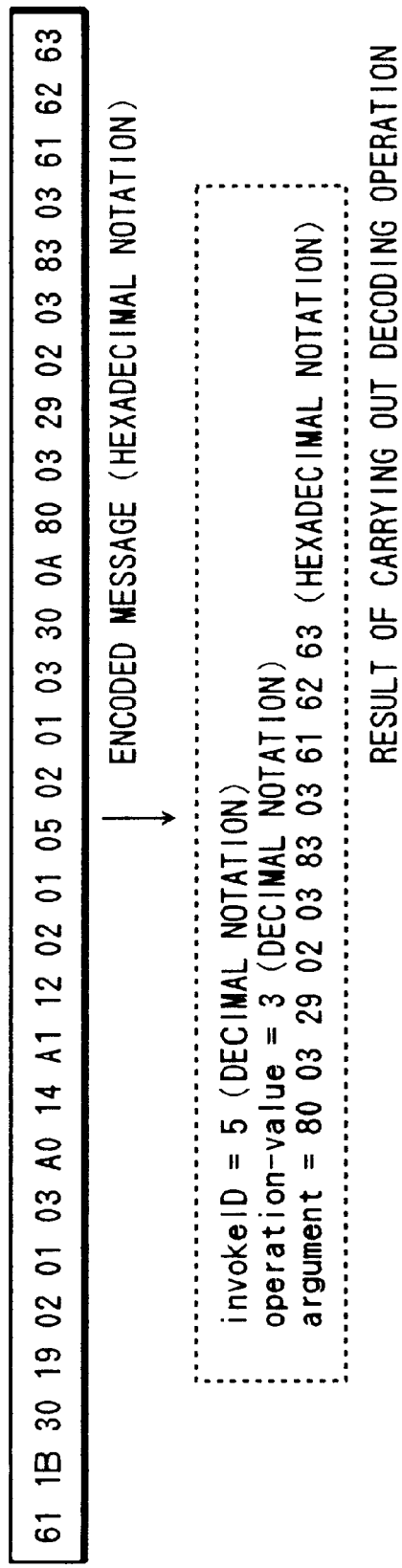
FIG. 15 is a view showing one example of the result of message decoding according to this invention.

FIG. 15 shows an example of a result of message decoding by the message decoder 1.

As illustrated in FIG. 15, the values of invokeID, operation-value, and argument corresponding to the respective components of ROIVapdu are produced from the encoded message. Herein, invokeID and operation-value are data of the INTEGER type while argument is data of the ANY type.

Referring to FIGS. 9, 16, 14, 2 and 3, description will be made about the finite state machine generator in the above-mentioned operation (I).

Figure 16:
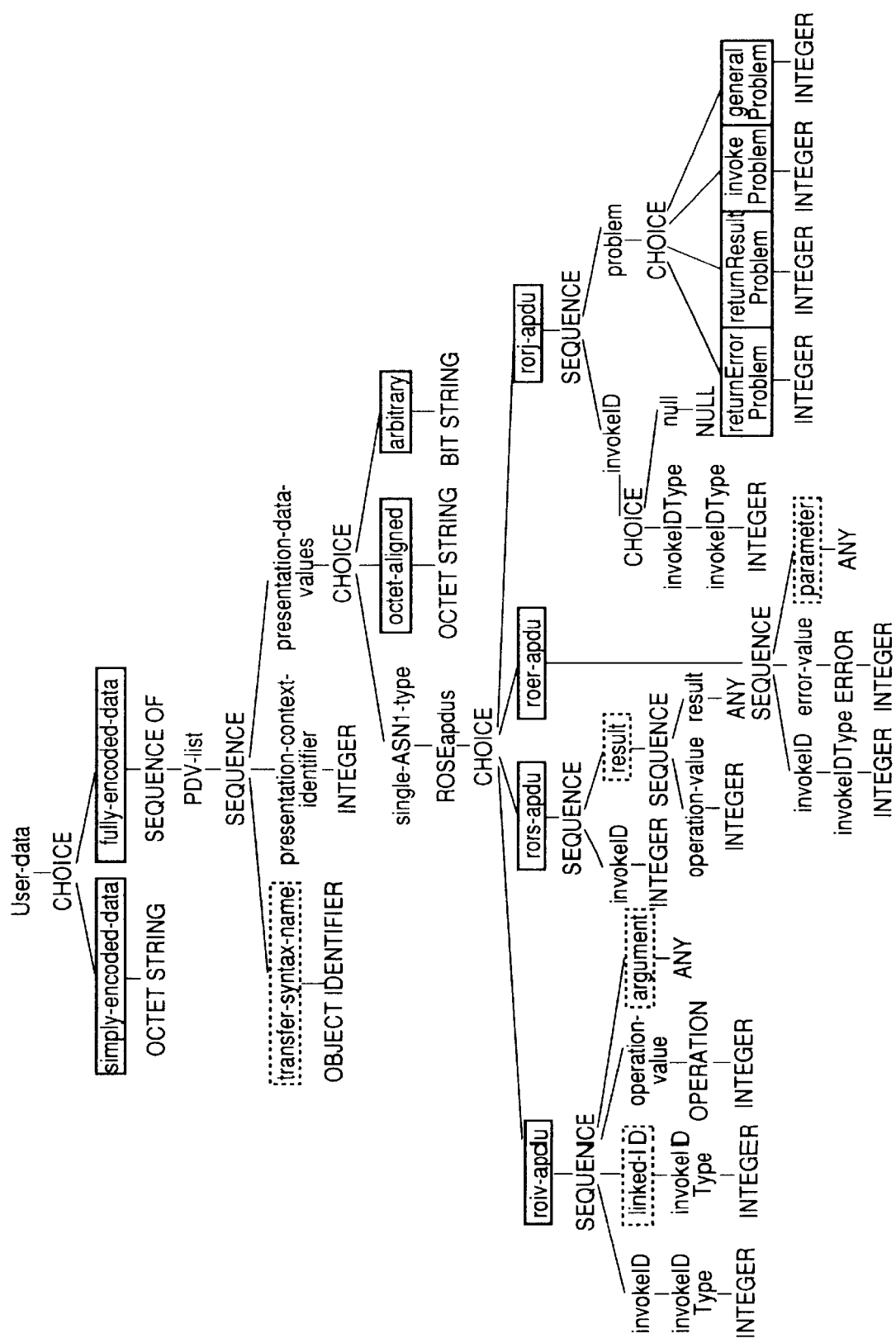
FIG. 16 is a view snowing the parse tree generated from the abstract syntax description.

When the descriptions in FIG. 2 are supplied to the parse tree generating section 201 in FIG. 9, the parse tree generating section 201 analyzes the syntax descriptions to generate the parse tree illustrated in FIG. 16. In FIG. 16, the nodes enclosed in the frames are declared as IMPLICIT (upon encoding, the tags representative of the nodes in consideration are encoded while the tags representative of the data types of the nodes in consideration are not encoded). The nodes enclosed in the dotted-line frames are declared as OPTIONAL (the nodes in consideration are components which may not be present).

When the above-mentioned parse tree is supplied to the finite state machine generating section 202, the finite state machine generating section 202 analyzes all nodes of the parse tree and generates the finite state machine for carrying out the decoding considering the abstract syntax descriptions illustrated in FIG. 14. In this event, if the parse tree includes a CHOICE node, a state is produced in which all tags representative of its child nodes are waited (this corresponds to the state 4106 in FIG. 14). In dependence upon the tags supplied, different transitions are produced (corresponding to the arrows 4207, 4214, 4220, and 4225 in FIG. 14).

If a particular node is declared as IMPLICIT, its direct child node is representative of the data type of the particular node in consideration. In this case, a state corresponding to the child node is not produced (in FIG. 14, it is inhibited to produce, between the states 4106 and 4107, a state in which the tag '30' representative of the SEQUENCE type is waited). If the node is declared as OPTIONAL, state transitions are produced in correspondence to presence and absence of the OPTIONAL-declared component, respectively (two transitions as the arrows 4209 and 4210 are produced from the state 4108 in FIG. 14).

As described above, it is possible according to this invention to restrict the syntax to be decoded and to reduce the scale of the circuit for simple field separation by restricting the syntax. Therefore, the scale of the message decoder can be suppressed small and the cost of the decoder can be decreased.

In this invention, the finite state machine is generated from the ASN.1 descriptions by the use of the finite state machine generator and is embedded in the message decoding section so as to use the finite state machine in the decoding operation. Thus, it is possible to perform the decoding considering the syntax. As a result, the user of the message decoder can use the output result of the message decoder with a small overhead as compared with the prior art.

In this invention, the finite state machine is obtained by automatically converting the syntax description by the use of the ASN.1 compiler technique and is embedded into the message decoding section so that it is optimum in decoding the syntax to be processed. Even if the abstract syntax to be processed is changed, the syntax can be automatically converted by the use of the ASN.1 compiler technique. It is therefore possible to flexibly cope with various syntax descriptions.

Prior Art of Message Encoders

Description will proceed to message encoders.

Conventional message encoders will hereunder be described for a better understanding of a message encoder of this invention.

In data communication, data components in a higher layer of the Open Systems Interconnection (OSI) and a user part of the Integrated Services Digital Network (ISDN) are generally described in the format according to the abstract syntax using the Abstract Syntax Notation 1 (ASN.1). Use of the Basic Encoding Rule (BER) for the Abstract Syntax Notation 1 is recommended, for example, in the ITU-T recommendation (International Telecommunication Union-Telecommunication recommendation) X.209 and the ITU-T recommendation X.208.

Specifically, the ITU-T recommendation X.209 recommends the encoding rule for encoding information objects, taking into account (1) the variety and the complexity of the information objects selected in the application layer, (2) the necessity of a highly developed notation for describing the information objects, and (3) the significance of separating and standardizing the encoding rule for encoding the information objects. On the other hand, the ITU-T recommendation X.208 prescribes the notation for defining the abstract syntax and the use in the application layer makes it possible to define the type of information required to be transferred by the use of the presentation service. In addition, the ITU-T recommendation X.208 also prescribes the notation for the use of values of the defined types. The ITU-T recommendation X.209 allows the presence of one or more encoding rules applied to the values of the types according to the notation prescribed in the ITU-T recommendation X.208.

The Basic Encoding Rule in the Abstract Syntax Notation 1 prescribes the usage as follows, (a) Each message comprises a sequence of data values of various kinds.

(b) Each data value comprises a tag field (identifier octet), a length field (length octet), a value field (contents octet), a contents end indication octet, and the like, and generally has a variable data length.

(c) Two kinds of data values are prescribed, one of which is of an encoded structure of a primitive type with its value field directly representing a value and the other of which is of a constructed type with its value field including one or more data values.

The Abstract Syntax Notation 1 includes following data types.

(1) BOOLEAN type, (2) ENUMERATED type,
(3) NULL type, (4) INTEGER type,
(5) REAL type, (6) OCTET STRING type,
(7) CHARACTER STRING type,
(8) BIT STRING type,
(9) OBJECT IDENTIFIER type,
(10) ANY type, (11) CHOICE type,
(12) SEQUENCE type, (13) SEQUENCE OF type,
(14) SET type, (15) SET OF type,
(16) PrintableString type.

For each data component, the "value" selected for each "type" of abstract syntax definitions described according to the Abstract Syntax Notation 1 are encoded by the use of the encoding rules for the Abstract Syntax Notation 1 to produce an octet sequence which is delivered onto a communication channel. According to the Basic Encoding Rule, for every value of each type, an identifier (ID) comprising an octet sequence for identifying the "type" of the value and length information (LI) comprising an octet sequence representative of the length of the value (bit length and octet length) are essentially appended to the "value".

Message encoders of the type are disclosed, for example, in Japanese Patent Publications JP-A 1-198145 and JP-A 7-98676. In the former, parse tree data produced from abstract syntax descriptions based on the Abstract Syntax Notation 1 and defining the structure of a message to be encoded are held. While the parse tree data is scanned, the value corresponding to each node in the parse tree data is encoded into the three fields including the tag field, the length field, and the value field. In the latter, the message to be encoded is not processed from its head but is encoded from its last position to the head in the order of the value field, the length field, and the tag field. In both of the message encoders, the encoding operation is basically executed with the structure and the routine which Will presently be described except that operation start positions are different.

Figure 17:
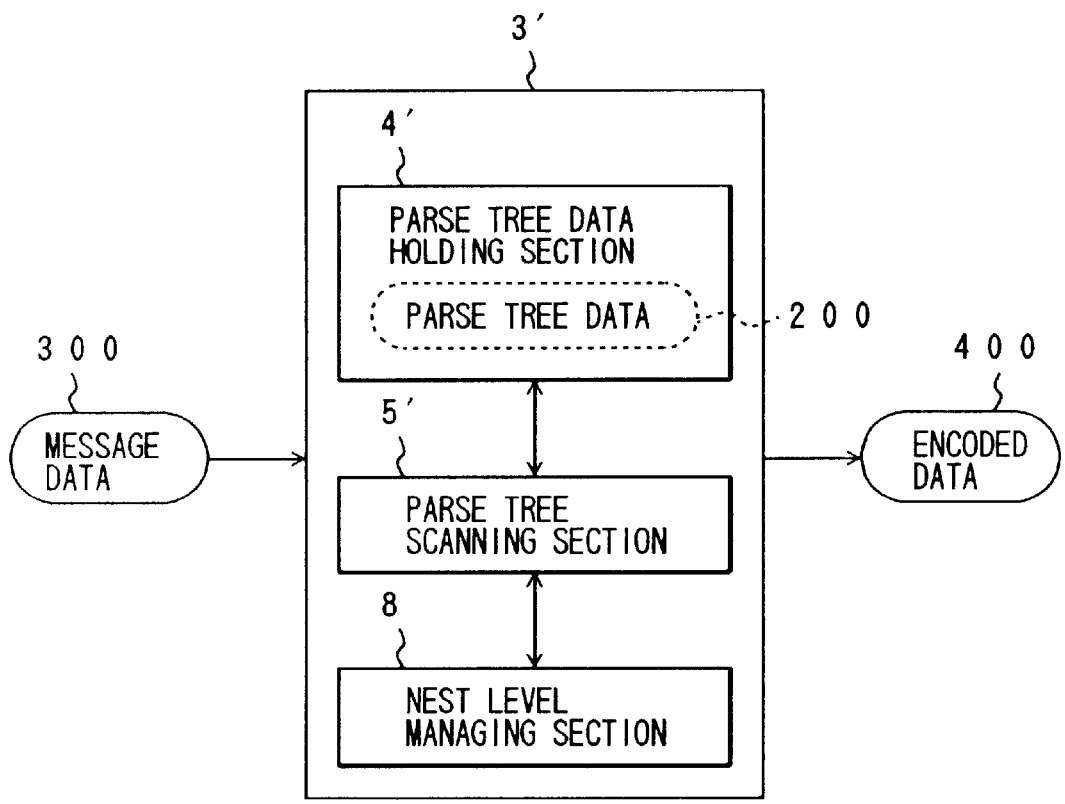
FIG. 17 is a block diagram showing the structure of a conventional message encoder.

FIG. 17 shows a schematic block diagram of the structure of a conventional message encoder 3'. The message encoder 3' mainly comprises a parse tree data holding section 4' having parse tree data 200, a parse tree scanning section 5', and a nest level managing section 8. Message data 300 supplied from a data transmission path are encoded to produce encoded data 400.

The parse tree data holding section 4' holds the parse tree data 200 obtained by converting, by the use of an Abstract Syntax Notation 1 compiler, an abstract syntax description according to the Abstract Syntax Notation 1 and defining the structure of the message to be encoded. The parse tree scanning section 5' scans the parse tree data 200 held by the parse tree data holding section 4', starting from a root node, successively in a depth first older (or along the direction of the depth). The nest level managing section 5' manages which nest level in the abstract syntax description according to the Abstract Syntax Notation 1 corresponds to a particular node being currently scanned in the parse tree data 200.

Figures 18, 19:
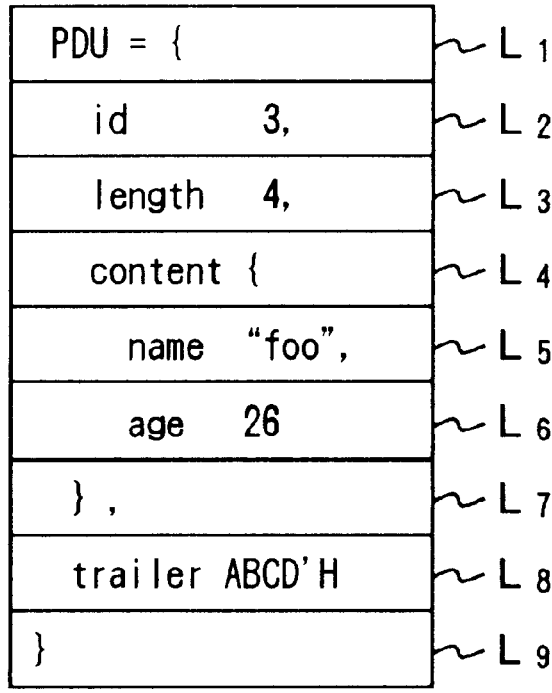
FIG. 18 is a list diagram showing an example of an abstract syntax description according to the Abstract Syntax Notation 1.
FIG. 19 in a view showing an example of specific values according to the Value Notation and corresponding to a message defined by the abstract syntax description illustrated in FIG. 18.

FIG. 18 shows one example of the abstract syntax description according to the Abstract Syntax Notation 1. The description in the figure defines the structure of a message "PDU" and represent that "PDU" is of the SEQUENCE type and comprises a sequence of five components including "id", "subid", "length", "content", and "trailer". Each of the components "id", "subid", and "length" is of the INTEGER type. The component "content" is of the SEQUENCE type and the component "trailer" is of the OCTET STRING type.

As will be understood from the definition that the component "content" is of the SEQUENCE type, a recursive definition is possible in the Abstract Syntax Notation 1. In other words, a component of the SEQUENCE type can recursively be of the SEQUENCE type. The component "subid" is declared as OPTIONAL. This means that, in the Value Notation which will later be described, a value corresponding to the component "subid" need not be present, i.e., may or may not be present.

Furthermore, each of the components "subid" and "length" is declared as IMPLICIT. Encoding is carried out for tags [0] and [1] associated with these components and is not carried out for tags representative of the INTEGER type of these components. To each of the components "subid" and "length", context-specific tags [0] and [1] are appended, respectively. As described above, each of the components "subid" and "length" is of the INTEGER type and the component "subid" is declared as OPTIONAL. If the value corresponding to the component "subid" is omitted, the relationship between the other INTEGER-type component and its value unless the context-specific tags are appended.

FIG. 19 shows one example of specific values in the Value Notation corresponding to the message defined by the abstract syntax description illustrated in FIG. 18. Specifically, a line L2 indicates that the value '3' corresponds to the INTEGER-type component "id". Likewise, lines L3, L5, L6, and L8 represent correspondences between the component "length" and the value '4', between the component "name" and the value 'foo', between the component "age" and the value '26', and between the component "trailer" and the value 'ABCD', respectively.

Figure 20:
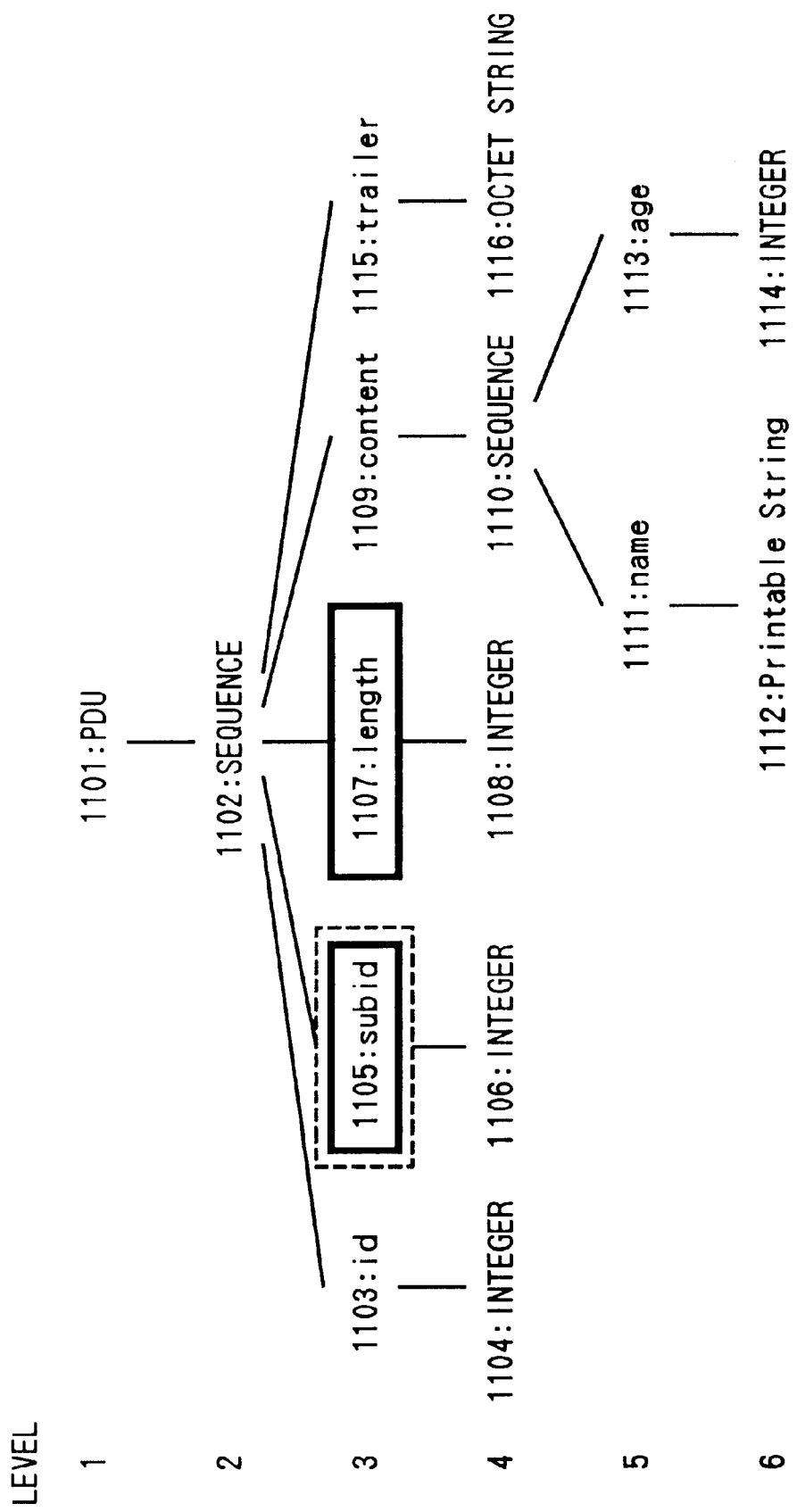
FIG. 20 is a view showing a parse tree data produced from the abstract syntax descriptions illustrated in FIG. 18.

FIG. 20 shows the parse tree data produced from the abstract syntax description illustrated in FIG. 18. The parse tree represents the structure of the message defined by the abstract syntax description according to the Abstract Syntax Notation. Among nodes 1101 through 1114, a child node directly under a particular node represents the type of its parent node or, if the type of the parent node is a constructed type, represents the component thereof. In the figure, the SEQUENCE type depicted by "SEQUENCE" in each of levels 2 and 4 applies to the above. Again in the figure, those nodes (the components "subid" and "length") surrounded by solid-line frames are declared as IMPLICIT. The node (the component "subid") surrounded by a dotted-line frame is declared as OPTIONAL.

Hereinafter, the operation of the message encoder 3' will be described with reference to FIGS. 19 through 20. In the following description, the message encoder 3' receives the message illustrated in FIG. 19, scans the parse tree data illustrated in FIG. 20, and produces the message illustrated in FIG. 21.

Figure 21:
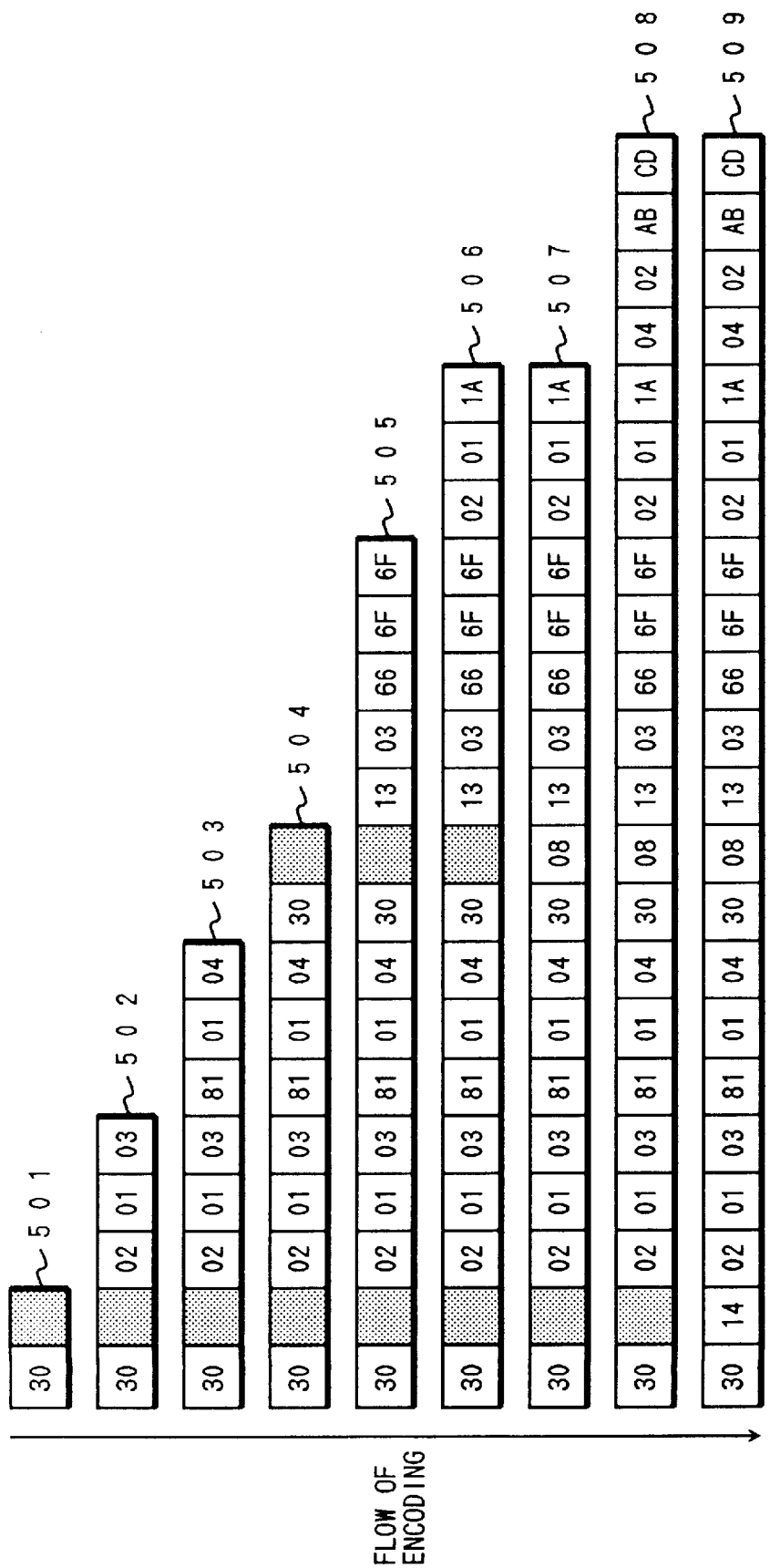
FIG. 21 is a view showing the routine of the encoding operation by the message encoder illustrated in FIG. 17.

FIG. 21 shows the routine of the encoding operation by the message encoder illustrated in FIG. 17. At the time instant when the message encoder 3' starts the encoding operation, the parse tree scanning section 102 points a root node "PDU" (node 1101 in FIG. 20) and a nest level managed by the nest level managing section 8 is initialized to zero. Supplied with the message data 300, the message encoder 3' examines the name of the message and starts the operation if the name of the message is an expected one, i.e., "PDU" in this example.

At first, the message is received to the line $L_1$. The parse tree scanning section 5' scans the parse tree data 200 in the order of the nodes 1101 and 1102 to detect that "PDU" is of the SEQUENCE type. Therefore, the tag field '30' corresponding to the SEQUENCE type is produced. Since the SEQUENCE type is a constructed type, "the" length field can not be identified at this stage. The neat level managing section 103 adds one to the nest level which then becomes equal to one (step 501 in FIG. 21).

Next, the message is received to the line $L_2$. The parse tree scanning section 5' scans the parse tree data 200 in the order of the nodes 1103 and 1104 to detect that "id" is of the INTEGER type. Therefore, the tag field '02' corresponding to the INTEGER type is produced. Since "id" has a value 3, the length field '01' and the value field '03' are produced (step 502 in FIG. 21).

The message is received to the line $L_3$. The component "subid" is judged to be omitted if it is not supplied. The parse tree scanning section 5' scans the parse tree data 200 in the order of the nodes 1105, 1106, 1107, and 1108 to detect that "length" is of the INTEGER type, declared as IMPLICIT, and given the context-specific tag [1]. Therefore, the tag field '81' corresponding to the context-specific tag [1] is produced. Since "length" has a value 4, the length field '01' and the value field '04' are produced (step 503 in FIG. 21).

When the message is received to the line $L_4$, the parse tree scanning section 5' scans the parse tree data 200 in the order of the nodes 1109 and 1110 to detect that "content" is of the SEQUENCE type. Therefore, the tag field '30' corresponding to the SEQUENCE type is produced. Since the SEQUENCE type is a constructed type, the length field can not be identified at this stage. The nest level managing section 8 further adds one to the nest level which then becomes equal to two (step 504 in FIG. 21).

When the message is received to the line $L_5$, the parse tree scanning section 5' scans the parse tree data 200 in the order of the nodes 1111 and 1112 to detect that "name" is of the PrintableString type. Therefore, the tag field '13' corresponding to the PrintableString type is produced. Since "name" has a value 'foo', the length field '03' and the value field '66 6F 6F' are produced (step 505 in FIG. 21).

When the message is received to the line $L_6$, the parse tree scanning section 5' scans the parse tree data 200 in the order of the nodes 1113 and 1114 to detect that "age" is of the INTEGER type. Therefore, the tag field '02' corresponding to the INTEGER type is produced. Since "age" has a value '26', the length field '01' and the value field '1A' are produced (step 506 in FIG. 21).

When the message is received to the line $L_7$, the parse tree scanning section 5' scans in the parse tree data 200 a subtree starting from the node 1110 as a root node to calculate the total length over the results of encoding the respective nodes of the subtree. After completion of scanning the subtree, it is possible to identify the length of the value field in the nest level 2. Specifically, the length field which has not been identified in the step 504 is equal to '08'. The nest level managing section 103 substracts one from the nest level which then becomes equal to one (step 507 in FIG. 21).

When the message is received to the line $L_8$, the parse tree scanning section 5' scans the parse tree data 200 in the order of the nodes 1115 and 1116 to detect that "trailer" is of the OCTET STRING type. Therefore, the tag field '04' corresponding to the OCTET STRING type is produced. Since "trailer" has the value 'ABCD' H (hexadecimal notation), the length field '02' and the value field 'ABCD' are produced (step 508 in FIG. 21).

When the message is received to the line $L_9$, the parse tree scanning section 5' scans in the parse tree data 200 a subtree starting from the node 1102 as a root node to calculate the total length over the results of encoding the respective nodes of the subtree. After completion of scanning the subtree, it is possible to identify the length of the value field in the nest level 1. Specifically, the length field which has not been identified in the step 501 is equal to '14' (hexadecimal notaion). The nest level managing section 8 substracts one from the nest level which then becomes equal to zero (step 509 in FIG. 21).

Figure 22:
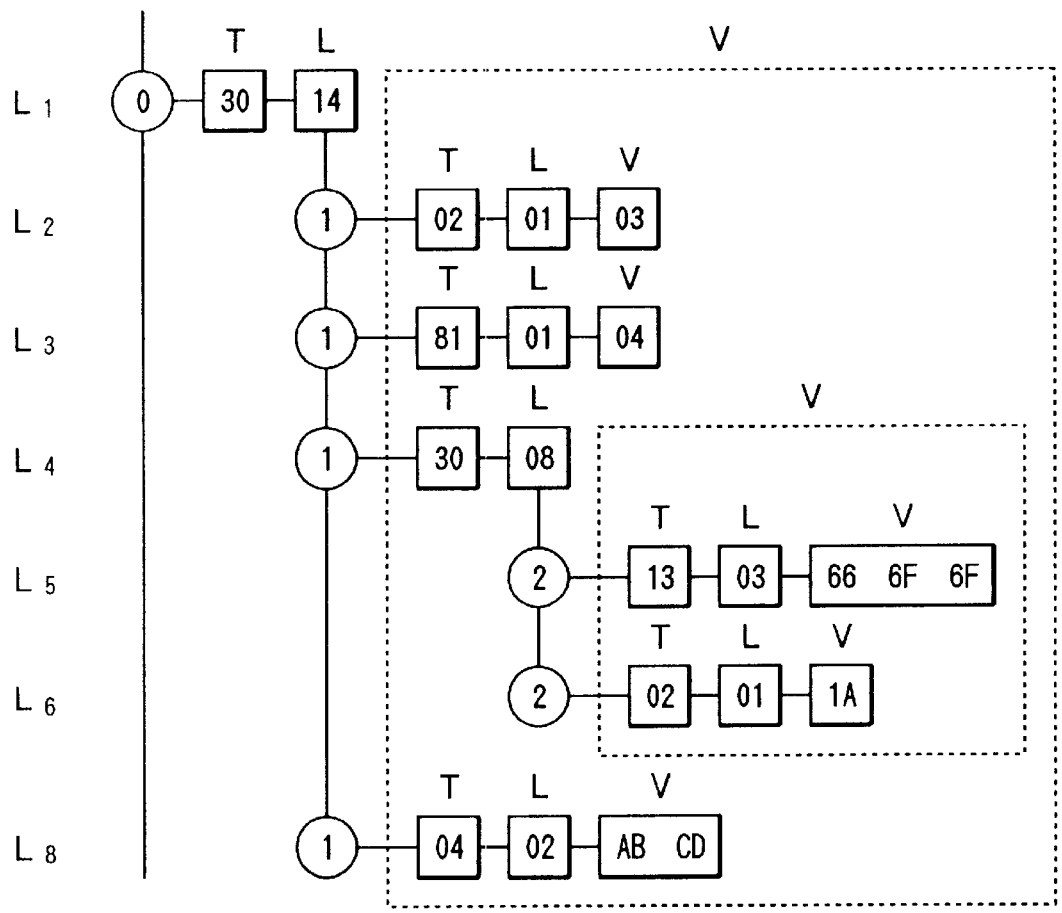
FIG. 22 is a view showing an encoded result obtained by the conventional message encoder.

FIG. 22 shows the result of actually encoding the message illustrated in FIG. 19 by the conventional message encoder 3'. In order to help understanding of the nest levels (shown by numerals enclosed by circles) of the message data, a resultant octet sequence is shown in a rearranged form. It is seen that the encoded message comprises the three fields including the tag field (T), the length field (L), and the value field (V) and has a recursive structure such that the value field again comprises the tag, the length, and the value fields.

However, upon management of the nest levels of the message data to be encoded, the recursive operation is required in order to obtain the length of the value field in each nest level. Therefore, the conventional message encoder has the following disadvantages.

First Disadvantage

In order to obtain the length of the value field in each nest level, means for holding, with respect to each nest level, the length of the value field of the nest level is required. If the above-mentioned means is implemented by software, a memory region for holding the length of the value field is dynamically reserved every time when the nest level of the message data being processed proceeds to a deeper level. In this manner, it is possible to cope with the case where the message data to be processed has a deep nest level.

On the other hand, when the above-mentioned means is implemented by hardware, it is impossible to dynamically reserve the memory region like in software implementation. At a hardware design stage, the depth of the nest level which can be dealt with is restricted. With an increase in number of the nest levels which can be dealt with, the cost for providing the means for holding the length of the value field of each nest level is increased. In case where the length of the value field is obtained by the recursive operation as in the prior art, severe constraint is imposed upon the message which can be dealt with.

Second Disadvantage

If the message data have a deep nest level, it is impossible to identify the length of the value field of an upper nest level unless the length of the value field of a lower nest level 18 identified. Therefore, in order to identify the lengths of all value fields, the parse tree data must be scanned a plurality of times. As a result, efficiency is much degraded.

Third Disadvantage

Unless the message data to be encoded are entirely supplied, the lengths of all value fields can not be identified. In this connection, a user of the message encoder 3' inevitably has a long waiting time from the input of the message data to the message encoder 3' to the output of the encoded result.

Message Encoders of this Invention

This invention provides a message encoder capable of suppressing an increase in scale of the encoder and carrying out an encoding operation at a high speed.

A message encoder according to this invention comprises parse tree data storing means for storing parse tree data produced from message data defined by the Abstract Syntax Notation, parse tree scanning means for scanning the parse tree data stored in the parse tree data storing means successively from a root node in a depth first order (or along a direction of depth) on the basis of an input of the message data to be encoded, length information supplying means for supplying as a length field an octet representative of an unidentified length when the length of a value field of a nest level to be scanned by the parse tree scanning means can not be identified, and end information supplying means for supplying an octet representative of the end of the value field when all data of the neat level to which length information is supplied by the length information supplying means have been processed.

Another message encoder according to this invention comprises parse tree data storing means for storing parse tree data produced from message data defined by the Abstract Syntax Notation, parse tree scanning means for scanning the parse tree data stored in the parse tree data storing means successively from a root node towards a deepest one on the basis of an input of the message data to be encoded, tag type judging means for judging the type of a tag to be scanned by the parse tree scanning means, field data appending means for producing, when the tag type judging means judges that the tag is of a constructed type, a tag field corresponding to the tag and a length field representative of an unidentified length or for producing, when judgement is made that the tag is of a primitive type, the tag field corresponding to the tag, and for appending these field data, and end octet appending means for appending, in case where the length field representative of the unidentified length is appended by the field data appending means, an octet representative of the end of a value field when all data of a nest level for which the length field is produced have been processed.

In addition to each of the message encoders according to this invention, it is preferred that an encoding operation is executed irrespective of the length of the message data to be encoded and that an output of an encoded result is started after lapse of a predetermined delay time.

Each message encoder according to this invention does not manage the nest levels of the message to be encoded. In case where it is impossible at each nest level to identify the length of the value field of the nest level in consideration, the octet representative of the unidentified length is supplied as the length field. At the time instant when all data of the nest level in consideration have been processed, the octet representative of the end of the value field is appended. The encoded result is successively outputted from the head of the result. Thus, since the nest levels of the message to be encoded are not managed, the encoder can be reduced in scale. By appending the octet representative of the end of the value field at the time instant when all data of each nest level have been processed, the result of processing is successively outputted from the head so as to shorten the waiting time before the encoded result is obtained.

Now, this invention will be described in detail in connection with one embodiment being illustrated.

Figure 23:
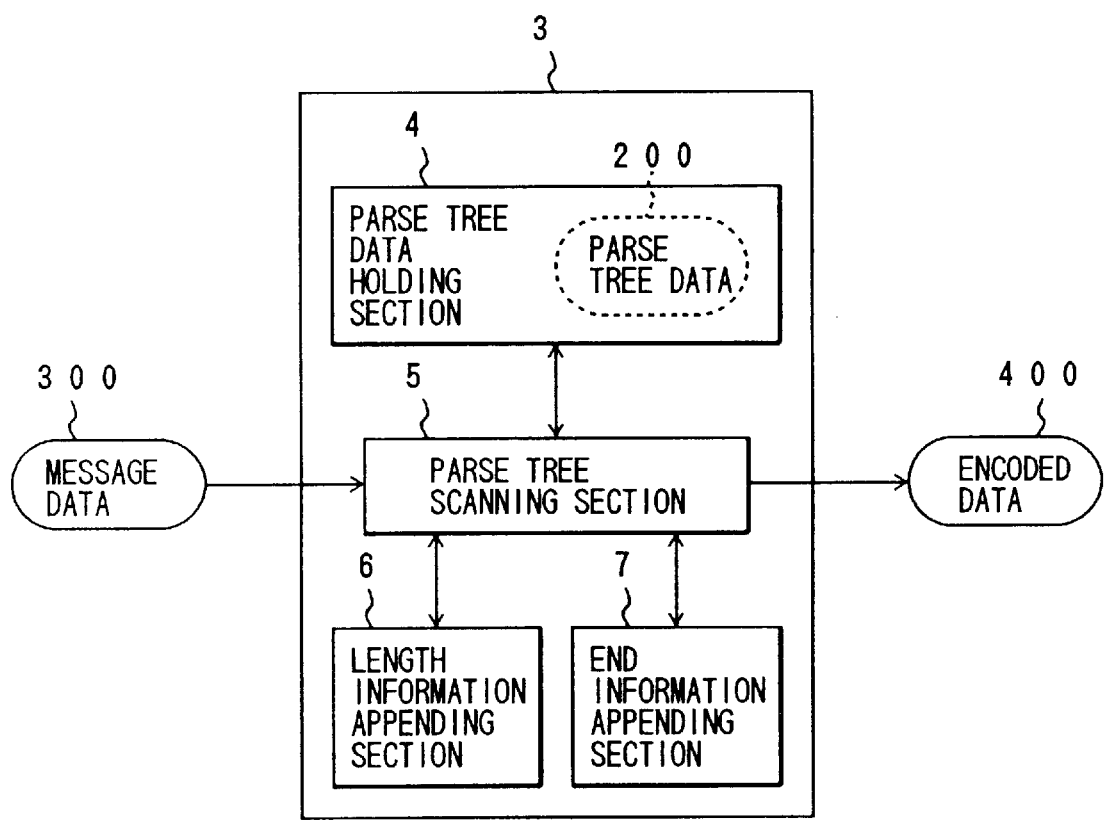
FIG. 23 is a block diagram showing the structure of a message encoder according to this embodiment.

FIG. 23 shows the structure of a characteristic portion of a message encoder 3 according to this embodiment. In FIG. 23, similar parts are designated by like reference numerals as in the conventional encoder illustrated in FIG. 17. The message encoder 3 in this embodiment mainly comprises a parse tree data holding section (parse tree data storing means) 4 having parse tree data 200, a parse tree scanning section (parse tree scanning means) 5, a length information appending section (length information supplying means) 6, and an end information appending section (end information supplying means) 7. Message data 300 supplied from a data transmission path are encoded and encoded data 400 are outputted.

The parse tree data holding section 4 holds the parse tree data 200 obtained by converting, by the use of an abstract syntax notation 1 compiler, an abstract syntax description according to the Abstract Syntax Notation 1 and defining the structure of the message to be encoded. The parse tree scanning section 5 scans, on the basis of the message data, the parse tree data 200 held by the parse tree data holding section 4, starting from a root node, successively in the depth first order. Information produced by the length information appending section 6 and the end information appending section 7 are appended at appropriate times into the encoded data as will later be described.

For each nest level, the length information appending section 6 appends length information comprising an octet representative of an unidentified length when the length of the value field in the nest level in consideration can not be identified. The end information appending section 7 appends end information comprising an octet representative of the end of the value field at the time instant when processing is completed for all data of the nest level to which the information is appended by the length information appending section 6. Thus, the nest levels of the message to be encoded are not managed and the encoded result is successively outputted from the head of the result.

Next referring to FIG. 24, description will be made about the operation of the message encoder in the above-mentioned embodiment.

Figure 24:
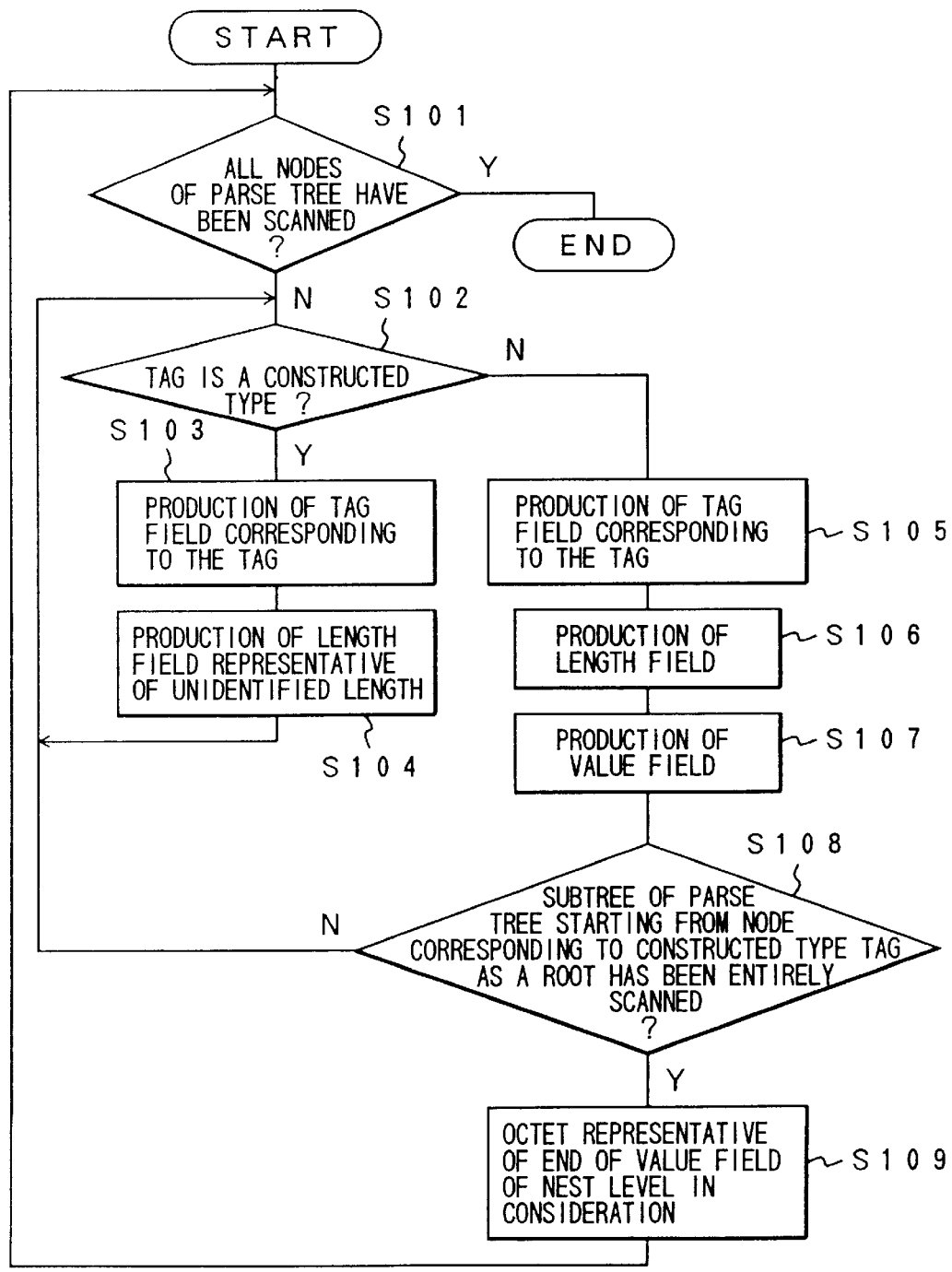
FIG. 24 is a flow chart for describing the operation of the message encoder according to this embodiment.

FIG. 24 shows the operation of the message encoder in this embodiment in order to describe the manner how the message encoder encodes the message data. The message encoder 1 at first examines whether or not all nodes of the parse tree data 200 held by the parse tree data holding section 4 have been scanned (step S101). If all of them have been scanned (step S101: Y), the encoding operation comes to an end.

On the other hand, if it is judged at the step S101 that all of them have not yet been scanned (step S101: N), examination is made about whether or not a tag corresponding to a node of the parse tree data 200 which is being scanned is of a constructed type (step S102). If it is judged at the step S102 that the tag being examined is of the constructed type (step S102: Y), a tag field corresponding to the tag is produced (step S103) and a length field representative of the unidentified length is produced (step S104). On the other hand, if it is judged at the step S102 that the tag being examined is not of the constructed type (step S102: N), the tag field corresponding to the tag is produced (step S105). Then, the length field is produced (step S106) and a value field is produced (step S107).

Subsequently, examination is made about whether or not, in the parse tree data 200, all nodes of a subtree starting from a root node corresponding to the constructed type have been scanned (step S108). If it is judged at the step S108 that all of them have not yet been scanned (step S108: N), it is meant that all data of the nest level in consideration are not yet been processed. In this event, the operation is repeated from the step S102. On the other hand, if it is judged at the step S108 that all of them have been scanned (step S108: Y), it is meant that all data of the nest level in consideration have been processed. In this event, an octet representative of the end of the value field of the nest level in consideration is appended (step S109) and the operation is repeated from the step S101.

Thus, when the message data 300 to be encoded arrive at the message encoder 3, the parse tree scanning section 5 scans the parse tree data 200 held by the parse tree data holding section 4 on the basis of the message data 300, and encodes those values corresponding to the respective nodes of the parse tree data 200.

In order to compare the manner how the message is encoded by the message encoder 3 of this invention with the prior art, description will hereafter be made about the routine of encoding the message data in FIG. 19 having the structure defined by the abstract syntax description illustrated in FIG. 18.

Figure 25:
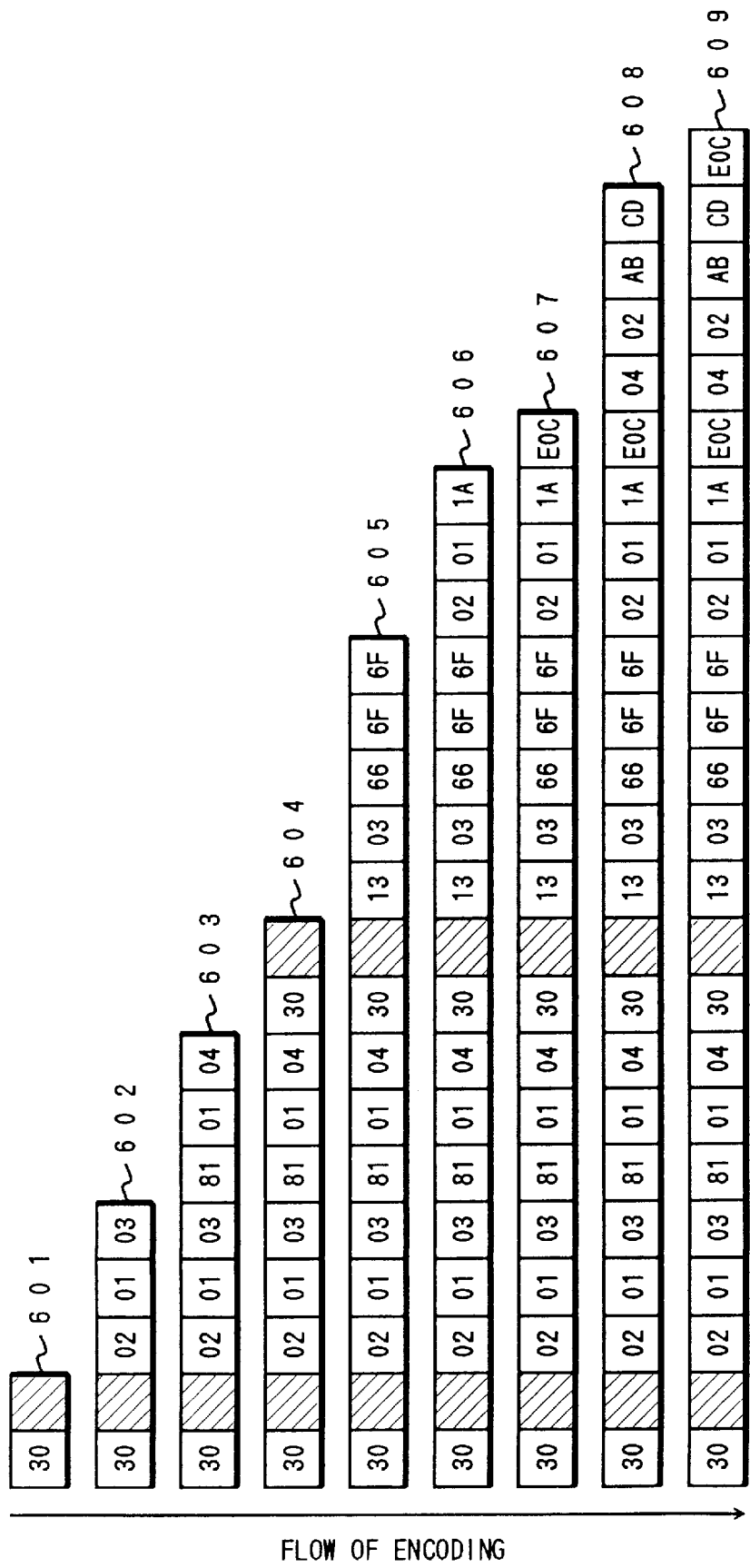
FIG. 25 is a view showing the routine of the encoding operation by the message encoder illustrated in FIG. 23.

At first, the message is received to the line $L_1$. The parse tree scanning section 5 scans the parse tree data 200 in the order of the nodes 1101 and 1102 to detect that "PDU" is of the SEQUENCE type. Therefore, the tag field '30' corresponding to the SEQUENCE type is produced. Since the SEQUENCE type is a constructed type, the length field can not be identified at this stage. Accordingly, as regards the length field, an octet representative of an unidentified length is appended as the length information (step 601 in FIG. 25).

Next, the message is received to the line $L_2$. The parse tree scanning section 5 scans the parse tree data 200 in the order of the nodes 1103 and 1104 to detect that "id" is of the INTEGER type. Therefore, the tag field '02' corresponding to the INTEGER type is produced. Since "id" has a value 3, the length field '01' and the value field '03' are produced (step 602 in FIG. 25).

Then, the message is received to the line $L_3$. The component "subid" is judged to be omitted if it is not supplied. The parse tree scanning section 5 scans the parse tree data 200 in the order of the nodes 1105, 1106, 1107, and 1108 to detect that "length" is of the INTEGER type, declared as IMPLICIT, and given a context-specific tag [1]. Therefore, the tag field '81' corresponding to the context-specific tag [1] is produced. Since "length" has a value 4, the length field '01' and the value field '04' are produced (step 603 in FIG. 25).

When the message is received to the line $L_4$, the parse tree scanning section 5 scans the parse tree data 200 in the order of the nodes 1109 and 1110 to detect that "content" is of the SEQUENCE type. Therefore, the tag field '30' corresponding to the SEQUENCE type is produced. Since the SEQUENCE type is a constructed type, the length field can not be identified at this stage. As regards the length field, an octet representative of an unidentified length is added as length information (step 604 in FIG. 25).

When the message is received to the line $L_5$, the parse tree scanning section 5 scans the parse tree data 200 in the order of the nodes 1111 and 1112 to detect that "name" is of the PrintableString type. Therefore, the tag field '13' corresponding to the PrintableString type is produced. Since "name" has a value 'foo', the length field '03' and the value field '66 6F 6F' are produced (step 605 in FIG. 25).

When the message is received to the line $L_6$, the parse tree scanning section 5 scans the parse tree data 200 in the order of the nodes 1113 and 1114 to detect that "age" is of the INTEGER type. Therefore, the tag field '02' corresponding to the INTEGER type is produced. Since "age" has a value '26', the length field '01' and the value field '1A' are produced (step 606 in FIG. 25).

When the message in received to the line $L_7$, the parse tree scanning section 5 detects completion of scanning for a subtree in the parse tree data 200 starting from the node 1110 as a root node. A value field end octet is produced in correspondence to the octet representative of the unidentified length produced at the step 604, and appended as the end information (EOC) (step 607 in FIG. 25).

When the message is received to the line $L_8$, the parse tree scanning section 5 scans the parse tree data 200 in the order of the nodes 1115 and 1116 to detect that "trailer" is of the OCTET STRING type. Therefore, the tag field '04' corresponding to the OCTET STRING type is produced. Since "trailer" has the value 'ABCD' (Hexadecimal notaion), the length field '02' and the value field 'ABCD' are produced (step 608 in FIG. 25).

When the message is received to the line $L_9$, the parse tree scanning section 5 detects completion of scanning for a subtree in the parse tree data 200 starting from the node 1102 as a root node. A value field end octet is produced in correspondence to the octet representative of the unidentified length produced at the step 601, and appended to the tail as the end information (EOC) (step 609 in FIG. 25).

Figure 26:
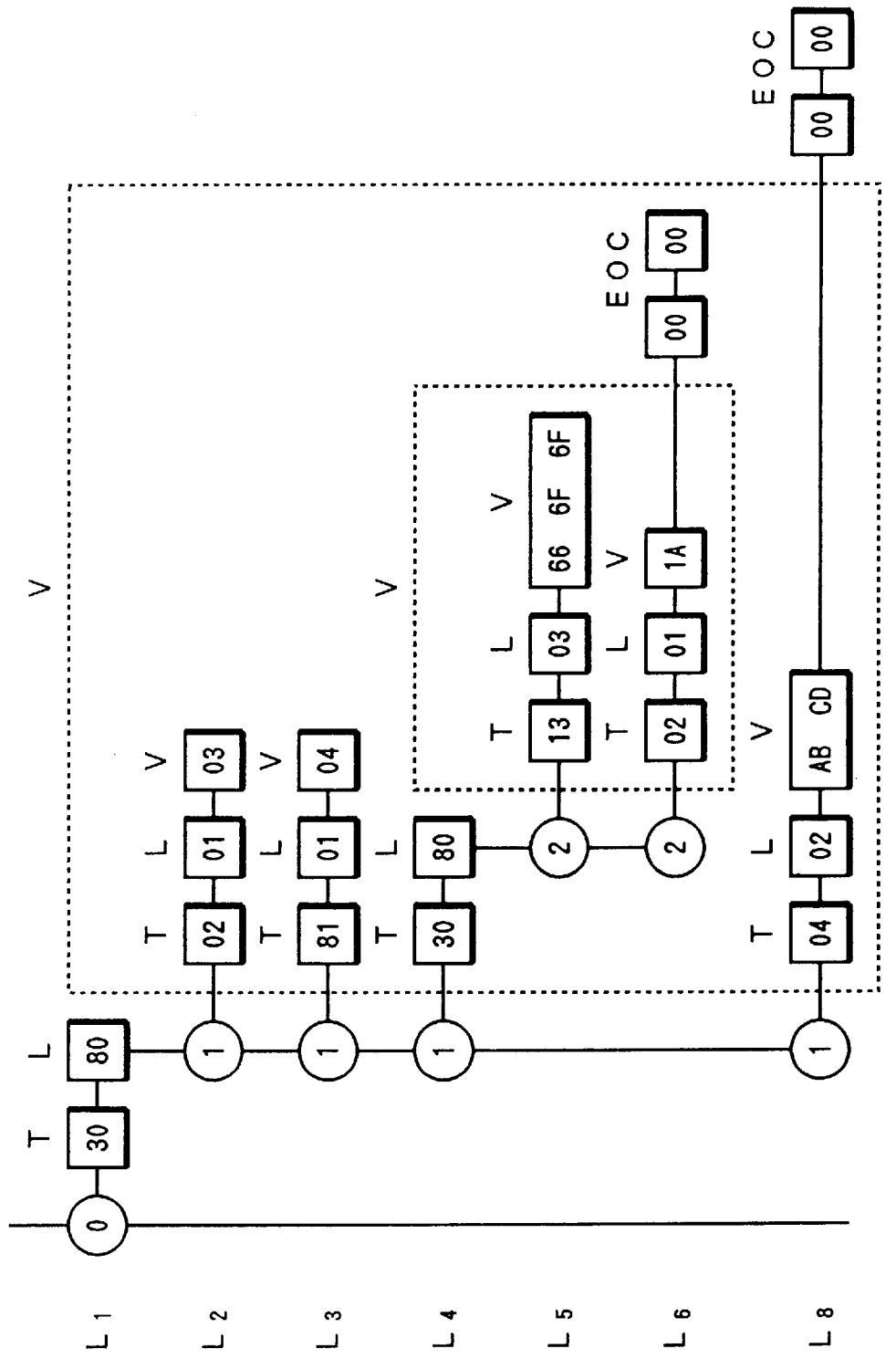
FIG. 26 is a view showing an encoded result obtained by the message encoder of this embodiment.

FIG. 26 shows the result of actually encoding the message illustrated in FIG. 19 by the message encoder 1 in this embodiment. In order to help understanding of the nest levels (shown by numerals enclosed by circles) of the message data, a resultant octet sequence is shown in a rearranged form. In FIG. 26, '80' is the octet representative of the unidentified length. As seen from the illustrated example, it is possible in this embodiment to obtain the encoded data similar to that of the prior art, without carrying out the recursive operation as in the prior art.

As described above, according to this embodiment, the length is not identified upon processing the component of the constructed type but the octet representative of the unidentified length is supplied as the length field. This makes it unnecessary to provide the nest level managing section required in the conventional message encoder. Thus, because the nest level managing section is unnecessary, it is possible to suppress the scale of the message encoder and to reduce the cost upon implementation of the encoder.

In addition, the octet representative of the unidentified length is used as the length field. It is therefore avoided that the length of the value field of an upper nest level can not be identified until the length of the value field of a lower nest level is identified. Therefore, scanning of the parse tree data is required only once. It is possible to improve the encoding efficiency. Furthermore, the message encoder in this embodiment can output the encoded result successively from the head. It is therefore possible to shorten the waiting time from the input of the message to be encoded to the start of production of the encoded result.

As is obvious from the foregoing description, management of the nest levels of the message to be encoded is not carried out in this invention so that the scale of the encoder can be reduced. In addition, by appending the octet representative of the end of the value field at the time instant when all data of each nest level have been processed, the encoded result can successively be outputted from the head. As a result, it is possible to shorten the waiting time before the encoded result is obtained.

What is claimed is:

1. A message decoder (1) including a message decoding section (102) supplied with an encoded message given by encoding, according to the Basic Encoding Rule, an objective message defined by an abstract syntax description described in accordance with the Abstract Syntax Notation, said message decoding section decoding said encoded message into a decoded message corresponding to said objective message, said message decoder comprising:

a finite state machine generator (2) comprising a parse tree generating section (201) supplied with said abstract syntax description for generating a parse tree corresponding to said abstract syntax description and a finite state machine generating section (202) connected to said parse tree generating section for generating a finite state machine (105) on the basis of said parse tree;

said message decoding section (102) being connected to said finite state machine generating section to decode said encoded message into said decoded message by the use of said finite state machine.

2. A message decoder as claimed in claim 1, wherein said finite state machine generating section generates, for a CHOICE node in said parse tree, a state of waiting for all tags representative of direct child nodes of said CHOICE node, and generates different transitions responsive to input of said tags, respectively.

3. A message decoder as claimed in claim 2, wherein said finite state machine generating section inhibits, for an IMPLICIT-declared node in said parse tree, generation of a state corresponding to a direct child node of said IMPLICIT-declared node.

4. A message decoder as claimed in claim 3, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

5. A message decoder as claimed in claim 1, wherein said finite state machine generating section inhibits, for an IMPLICIT-declared node in said parse tree, generation of a state corresponding to a direct child node of said IMPLICIT-declared node.

6. A message decoder as claimed in claim 5, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

7. A message decoder as claimed in claim 1, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

8. A finite state machine generator (2) for use in combination with a message decoder (1) including a message decoding section (102) supplied with an encoded message given by encoding, according to the Basic Encoding Rule, an objective message defined by an abstract syntax description described in accordance with the Abstract Syntax Notation, said message decoding section decoding said encoded message into a decoded message corresponding to said objective message, said finite state machine generator comprising:

a parse tree generating section (201) supplied with said abstract syntax description for generating a parse tree corresponding to said abstract syntax description; and a finite state machine generating section (202) connected to said parse tree generating section and said message decoding section for generating a finite state machine (105) on the basis of said parse tree to make said message decoding section decode said encoded message into said decoded message by the use of said finite state machine.

9. A finite state machine generator as claimed in claim 8, wherein said finite state machine generating section generates, for a CHOICE node in said parse tree, a state of waiting for all tags representative of direct child nodes of said CHOICE node, and generates different transitions responsive to input of said tags, respectively.

10. A message decoder as claimed in claim 9, wherein said finite state machine generating section inhibits, for an IMPLICIT-declared node in said parse tree, generation of a state corresponding to a direct child node of said IMPLICIT-declared node.

11. A message decoder as claimed in claim 10, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

12. A message decoder as claimed in claim 8, wherein said finite state machine generating section inhibits, for an IMPLICIT-declared node in said parse tree, generation of a state corresponding to a direct child node of said IMPLICIT-declared node.

13. A message decoder as claimed in claim 12, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

14. A message decoder as claimed in claim 8, wherein said finite state machine generating section generates, for an OPTIONAL-declared node in said parse tree, a transition upon presence of an input corresponding to an OPTIONAL-declared component in the syntax description, and generates another transition upon absence of the input corresponding to said OPTIONAL-declared component in said syntax description.

15. A combination of a finite state machine generator (2) and a message decoder (1) including a message decoding section (102) supplied with an encoded message given by encoding, according to the Basic Encoding Rule, an objective message defined by an abstract syntax description described in accordance with the Abstract Syntax Notation, said message decoding section decoding said encoded message into a decoded message corresponding to said objective message, said finite state machine generator comprising a parse tree generating section (201) supplied with said abstract syntax description for generating a parse tree corresponding to said abstract syntax description and a finite state machine generating section (202) connected to said parse tree generating section for generating a finite state machine (105) on the basis of said parse tree, said message decoding section (102) being connected to said finite state machine generating section to decode said encoded message into said decoded message by the use of said finite state machine.

16. A message encoder (3) for producing an encoded message (400) by encoding, according to the Basic Encoding Rule, an objective message (300) having input data defined by an abstract syntax description described in accordance with the Abstract Syntax Notation, said message encoder including parse tree data storing means (4) for preliminarily storing parse tree data (200) produced from said abstract syntax description, said message encoder comprising:

parse tree scanning means (5) connected to said parse tree data storing means and supplied with said objective message for scanning, as scanned data, said parse tree data successively from a root node of said parse tree data in a depth first order (or along a direction of depth of said parse tree data) on the basis of the input data of said objective message to produce, as said encoded massage, encoded data corresponding to the input data which are determined by said scanned data;

length information supplying means (6) connected to said parse tree scanning means for supplying, when said parse tree scanning means does not identify at a time the length of a value field (V) of a nest level for a particular scanned datum of said scanned data, said parse tree scanning means with an unidentified length-datum representative of an unidentified length as a length field (L) of said nest level to make said parse tree scanning means produce said unidentified length-datum as the encoded datum corresponding to the input datum which is determined by said particular scanned datum; and end information supplying means (7) for supplying, when said parse tree scanning means scans a nest end datum of said nest level as an end scanned datum of said scanned data, said parse tree scanning means with a value field end datum representative of an end of the value field of said nest level to make said parse tree scanning means produce said value field end datum following the encoded datum corresponding to the input datum which is determined by said end scanned datum.

17. A message encoder as claimed in claim 16, wherein said parse tree scanning means specifies said particular scanned datum when said parse tree scanning means judges (Y of S102) that a tag for said particular scanned datum is of a constructed type.

18. A message encoder as claimed in claim 17, wherein said parse tree scanning means creates, when said parse tree scanning means specifies said particular scanned datum, a tag datum representative of the tag of said constructed type as a tag field (T) of said nest level and produces (S103 and S104) a combination of said tag datum and said unidentified length-datum following said tag datum as the encoded datum corresponding to the input datum which is determined by said particular scanned datum.

19. A message encoder (3) for producing an encoded message (400) by encoding, according to the Basic Encoding Rule, an objective message (300) having input data defined by an defined by an abstract syntax description described in accordance with the Abstract Syntax Notation, said message encoder including a parse tree data storing section (4) for preliminarily storing parse tree data (200) produced from said abstract syntax description, said message encoder comprising:

a parse tree scanning section (5) connected to said parse tree data storing section and supplied with said objective message for scanning, as scanned data, said parse tree data successively from a root node of said parse tree data in a depth first order (or along a direction of depth of said parse tree data) on the basis of the input data of said objective message to produce, as said encoded message, encoded data corresponding to the input data which are determined by said scanned data;

a length information appending section (6) connected to said parse tree scanning section for supplying, when said parse tree scanning section does not identify at a time the length of a value field (V) of a nest level for a particular scanned datum of said scanned data, said parse tree scanning section with an unidentified length-datum representative of an unidentified length as a length field (L) of said nest level to make said parse tree scanning section produce said unidentified length-datum as the encoded datum corresponding to the input datum which is determined by said particular scanned datum; and an end information appending section (7) for supplying, when said parse tree scanning section scans a nest end datum of said nest level as an end scanned datum of said scanned data, said parse tree scanning section with a value field end datum representative of an end of the value field of said nest level to make said parse tree scanning section produce said value field end datum following the encoded datum corresponding to the input datum which is determined by said end scanned datum.

20. A message encoder as claimed in claim 19, wherein said parse tree scanning section specifies said particular scanned datum when said parse tree scanning section judges (Y of S102) that a tag for said particular scanned datum is of a constructed type.

21. A message encoder as claimed in claim 20, wherein said parse tree scanning section creates, when said parse tree scanning section specifies said particular scanned datum, a tag datum representative of the tag of said constructed type as a tag field (T) of said nest level and produces (S103 and S104) a combination of said tag datum and said unidentified length-datum following said tag datum as the encoded datum corresponding to the input datum which is determined by said particular scanned datum.

* * * * *